(12) United States Patent
Mezzacapo et al.

(10) Patent No.: US 12,554,794 B2
(45) Date of Patent: Feb. 17, 2026

(54) MAX-CUT APPROXIMATE SOLUTION VIA QUANTUM RELAXATION

(71) Applicant: International Business Machines Corporation, Armonk, NY (US)

(72) Inventors: Antonio Mezzacapo, Ardsley, NY (US); Charles Hadfield, New York, NY (US); Rudy Raymond Harry Putra, Yokohama (JP); Toshinari Itoko, Chigasaki (JP); Takashi Imamichi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1143 days.

(21) Appl. No.: 17/517,072

(22) Filed: Nov. 2, 2021

(65) Prior Publication Data

US 2023/0133198 A1 May 4, 2023

(51) Int. Cl.
*G06F 17/11* (2006.01)
*G06N 10/00* (2022.01)

(52) U.S. Cl.
CPC ............ *G06F 17/11* (2013.01); *G06N 10/00* (2019.01)

(58) Field of Classification Search
CPC ................................ G06F 17/175; G06F 17/11
See application file for complete search history.

(56) References Cited

U.S. PATENT DOCUMENTS

| | | | |
|---|---|---|---|
| 10,846,366 | B1 | 11/2020 | Otterbach et al. |
| 11,120,357 | B2 | 9/2021 | Zeng et al. |
| 12,165,005 | B1* | 12/2024 | Kubica ............... G06F 11/3442 |
| 2009/0299947 | A1* | 12/2009 | Amin .................... B82Y 10/00 |
| | | | 706/13 |
| 2020/0160204 | A1 | 5/2020 | Johnson et al. |
| 2021/0056455 | A1 | 2/2021 | Shehab |
| 2022/0058509 | A1* | 2/2022 | Hertzberg ............. G06N 10/00 |
| 2022/0198312 | A1* | 6/2022 | Delfosse ............. G06F 11/1048 |
| 2022/0269961 | A1* | 8/2022 | Pramanik ............. G06N 20/00 |
| 2022/0284337 | A1* | 9/2022 | Radin .................... G06N 10/60 |
| 2024/0338590 | A1* | 10/2024 | Zimborás ............... G06F 17/11 |

OTHER PUBLICATIONS

Tabi, Zsolt, et al. "Quantum optimization for the graph coloring problem with space-efficient embedding." 2020 IEEE international conference on quantum computing and engineering (QCE). IEEE, 2020. (Year: 2020).*

(Continued)

*Primary Examiner* — Emily E Larocque
*Assistant Examiner* — Markus Anthony Villanueva
(74) *Attorney, Agent, or Firm* — Amin, Turocy & Watson, LLP

(57) ABSTRACT

Systems and techniques that facilitate max-cut approximate solution via quantum relaxation are provided. In various embodiments, a system can comprise a receiver component that can access a graph having a set of vertices and a set of edges. In various instances, the system can comprise a rounding component that can compute a max-cut approximate solution for the graph based on a quantum Hamiltonian relaxation of the graph.

20 Claims, 17 Drawing Sheets
(4 of 17 Drawing Sheet(s) Filed in Color)

(56) References Cited

OTHER PUBLICATIONS

Miller, Matthias, and Daniel Miller. "GraphStateVis: Interactive visual analysis of qubit graph states and their stabilizer groups." 2021 IEEE International Conference on Quantum Computing and Engineering (QCE). IEEE, 2021. (Year: 2021).*

Xiong, Yifeng, et al. "Sampling overhead analysis of quantum error mitigation: Uncoded vs. coded systems." IEEE Access 8 (2020): 228967-228991. (Year: 2020).*

Litinski, Daniel. "Magic state distillation: Not as costly as you think." Quantum 3 (2019): 205. (Year: 2019).*

Fuller, Bryce, et al. "Approximate solutions of combinatorial problems via quantum relaxations." IEEE Transactions on Quantum Engineering (Nov. 8, 2021). (Year: 2021).*

Hillmich, Stefan, et al. "Decision diagrams for quantum measurements with shallow circuits." 2021 IEEE International Conference on Quantum Computing and Engineering (QCE). IEEE, 2021. (Year: 2021).*

Anonymous. "Qiskit Optimization overview". Qiskit Optimization 0.6.1. Qiskit Optimization Development Team (Year: 2024).*

Anonymous. "Qiskit Optimization 0.6.1" Release Qiskit Optimization 0.6.1 • qiskit-community/qiskit-optimization • GitHub (Year: 2024).*

Farhi, E. et al. | "A quantum approximate optimization algorithm". arXiv:1411.4028v1 [quant-ph] Nov. 14, 2014, 16 pages.

Ambainis, A. et al. | "Dense Quantum Coding and a Lower Bound for 1-way Quantum Automata". arXiv.quant-ph/9804043v2 Nov. 25, 1998, 12 pages.

Huang, H.-Y. et al. | "Predicting many properties of a quantum system from very few measurements". Nature 16, 1050 (2020), 40 pages.

Kandala, A. et al. | "Hardware-efficient variational quantum eigensolver for small molecules and quantum magnets". Nature, 549(7671):242-246, 2017, 24 pages.

Nannicini, G. | "Performance of hybrid quantum/classical variational heuristics for combinatorial optimization". rearXiv: 1805.12037v3 [quant-ph] Dec. 13, 2018, 15 pages.

Mell et al., "The NIST Definition of Cloud Computing," Recommendations of the National Institute of Standards and Technology, NIST Special Publication 800-145, Sep. 2011, 7 pages.

Moriayama Y et al. | "Search performance analysis of qubit convergence measure for quantum-inspired evolutionary algorithm introducing on maximum cut problem". International Journal of Computational Intelligence Studies, vol. 7, No. 3-4, pp. 231-252, 2018.

Farhi et al., "Quantum computation by adiabatic evolution", arXiv preprint quant-ph/0001106v1, Jan. 28, 2000, 24 pages.

Farhi et al., A quantum approximate optimization algorithm applied to a bounded occurrence constraint problem, arXiv:1412.6062v2, Jun. 25, 2015, 13 pages.

Zhou et al., "Quantum approximate optimization algorithm: Performance, mechanism, and implementation on near-term devices", Physical Review X, vol. 10, No. 2, Nov. 9, 2019, 23 pages.

Egger et al., "Warm-starting quantum optimization", arXiv preprint, arXiv:2009.10095v4, 2020, 20 pages.

Tate et al., "Bridging Classical and Quantum with SDP initialized warmstarts for QAOA", arXiv:2010.14021v2, 2020, 29 pages.

McClean et al., "Low depth mechanisms for quantum optimization", arXiv preprint arXiv:2008.08615v1, 2020, 30 pages.

Peruzzo et al., "A variational eigenvalue solver on a photonic quantum processor", Nature communications, vol. 5, No. 4213, Jul. 23, 2014, 7 pages.

Kitaev et al., "Quantum measurements and the abelian stabilizer problem", arXiv preprint quant-ph/9511026v1, 1995, 22 pages.

Anshu et al., "Improved approximation algorithms for bounded-degree local hamiltonians", arXiv preprint arXiv:2105.01193v1, 2021, 21 pages.

Motta et al., Determining eigenstates and thermal states on a quantum computer using quantum imaginary time evolution:, Nature Physics, vol. 16, No. 2, 2020, 18 pages.

Goemans et al., "Improved approximation algorithms for maximum cut and satisfiability problems using semide nite programming", Journal of the Association for Computing Machinery, vol. 42, No. 6, Nov. 1995, pp. 1115-1145.

Ambainis et al., "Dense quantum coding and quantum nite automata", Journal of the Association for Computing Machinery, vol. 49, No. 4, Jul. 2002, pp. 496-511.

Nayak A. et al., "Optimal lower bounds for quantum automata and random access codes", Proceedings of the 40th Annual Symposium on Foundations of Computer Science, FOCS '99, IEEE Computer Society, 1999, pp. 369-376.

Holevo et al., "Bounds for the quantity of information transmitted by a quantum communication channel", Problems of Information Transmission, vol. 9, No. 3, 1973, pp. 177-183.

Hayashi et al., "(4,1)-Quantum Random Access Coding Does Not Exist—One Qubit Is Not Enough to Recover One of Four Bits", New Journal of Physics, vol. 8, No. 8, Aug. 2006, 8 pages.

Welsh et al., "An upper bound for the chromatic number of a graph and its application to timetabling problems", The Computer Journal, vol. 10, No. 1, Jan. 1967, pp. 85-86.

Tan et al., "Qubit-efficient encoding schemes for binary optimisation problems", arXiv preprint arXiv:2007.01774v2, 2020, 19 pages.

Patti et al., "Nonlinear Quantum Optimization Algorithms via Efficient Ising Model Encodings", arXiv preprint arXiv:2106.13304v1, Jun. 24, 2021, 10 pages.

Hadfield et al., "Measurements of Quantum Hamiltonians with Locally-Biased Classical Shadows", arXiv e-prints, arXiv:2006.15788v1, Jun. 29, 2020, 14 pages.

Huang et al., "Efficient estimation of pauli observables by derandomization", arXiv preprint arXiv:2103.07510v1, Mar. 12, 2021, 12 pages.

Hadfield C., "Adaptive pauli shadows for energy estimation", arXiv preprint arXiv:2105.12207v1, May 25, 2021, 4 pages.

Wu et al., "Overlapped grouping measurement: A unified framework for measuring quantum states", arXiv preprint arXiv:2105.13091v1, May 27, 2021, 12 pages.

Eddins et al., Doubling the size of quantum simulators by entanglement forging, arXiv preprint arXiv:2104.10220v1, Apr. 20, 2021, 17 pages.

IBM, "ILOG CPLEX Optimization Studio 12.10.0: CP Optimizer Online Documentation", 2021, 2 pages.

Anshu et al., "Beyond Product State Approximations for a Quantum Analogue of Max Cut", In Steven T. Flammia, editor, 15th Conference on the Theory of Quantum Computation, Communication and Cryptography (TQC 2020), vol. 158 of Leibniz International Proceedings in Informatics (LIPIcs), No. 7, 2020, pp. 7:1-7:15.

Lieb E. H., "The classical limit of quantum spin systems", Communications in Mathematical Physics, vol. 31, No. 4, 1973, pp. 327-340.

Bravyi et al., "Approximation algorithms for quantum many-body problems", Journal of Mathematical Physics, vol. 60, No. 3, 2019, 17 pages.

Charikar et al., Maximizing quadratic programs: extending Grothendieck's inequality, 45th Annual IEEE Symposium on Foundations of Computer Science, 2004, pp. 54-60.

Khot et al., "SDP Gaps and UGC-hardness for Max-Cut-Gain", Theory of Computing, vol. 5, No. 4, 2009, pp. 83-117.

Trevisan et al., "Max cut and the smallest eigenvalue", Proceedings of the Forty-First Annual ACM Symposium on Theory of Computing, STOC '09, Association for Computing Machinery, 2009, pp. 263-272.

Kempe et al., "Unique games with entangled provers are easy", 2008 49th Annual IEEE Symposium on Foundations of Computer Science, 2008, pp. 457-466.

Harrow et al., "Extremal eigenvalues of local Hamiltonians", Quantum, Apr. 2021, pp. 1-6.

Liu et al., "Bilevel optimization of blended composite wing panels", Journal of aircraft, vol. 48, No. 1, 2011, pp. 107-118.

Irisarri et al. "Multiobjective stacking sequence optimization for laminated composite structures", Composites Science and Technology, vol. 69, No. 7-8, Jun. 2009, pp. 983-990.

(56) References Cited

OTHER PUBLICATIONS

Niu et al., "Composite Airframe Structures: Practical Design Information and Data", Hong Kong Conmilit Press Ltd, 1992, 1 page.
Aleksandrowicz et al., "Qiskit: An open-source framework for quantum computing", 2021, webpages https://zenodo.org/record/2562111#.YebtS9VMHIU, last accessed Jan. 18, 2022, 5 pages.
Haribara, Y. et al. | "Quantum Computing with Non-classical Light: A Coherent Ising Machine for Maximum-Cut Problems". Encyclopedia of Spectroscopy and Spectrometry, Third Edition, http://dx.doi.org/10.1016/B978-0-12-409547-2.12112-2, 8 pages.

\* cited by examiner

ACCESS A GRAPH $G = \{V, E\}$, WHERE $V$ IS A SET OF VERTICES OF THE GRAPH $G$, AND WHERE $E$ IS A SET OF EDGES OF THE GRAPH $G$.

COLOR THE GRAPH $G$ SUCH THAT ANY TWO VERTICES IN $V$ THAT ARE COUPLED BY AN EDGE IN $E$ HAVE DIFFERENT COLORS. THIS YIELDS A SET OF COLORS $C$ AND A PLURALITY OF SUBSETS OF VERTICES $V_i$ FOR $i \in [|C|]$, WHERE $V = \bigcup_{i=1}^{|C|} V_i$ AND $|V| = \sum_{i=1}^{|C|} |V_i|$.

FOR $i = 1: |C|$          (FOR EACH COLOR IN $C$)

LET $n_i = \lceil \frac{|V_i|}{3} \rceil$. HERE, $n_i$ IS THE NUMBER OF QUBITS NEEDED TO REPRESENT THE VERTICES THAT HAVE THE COLOR $i$.

NOTE THAT THERE EXIST $3n_i$ UNIQUE WEIGHT-1 PAULI OPERATORS THAT ARE SUPPORTED BY $n_i$ QUBITS. LET $Q_i$ BE THAT SET OF UNIQUE WEIGHT-1 PAULI OEPRATORS.

FOR $j = 1: |V_i|$          (FOR EACH VERTEX HAVING THE COLOR $i$)

ASSIGN, TO THE $j$-TH VERTEX THAT HAS THE COLOR $i$, ANY WEIGHT-1 PAULI OPERATOR $P_{i,j} \in Q_i$.

REMOVE $P_{i,j}$ FROM $Q_i$.

END FOR
END FOR

FOR $i = 1: |C|$          (FOR EACH COLOR IN $C$)
    FOR $j = 1: |V_i|$          (FOR EACH VERTEX HAVING THE COLOR $i$)

$$\text{LET } P_{i,j} = \underbrace{I \otimes \ldots \otimes I}_{\sum_{x=1}^{i-1} n_x} \otimes P_{i,j} \otimes \underbrace{I \otimes \ldots \otimes I}_{\sum_{x=i+1}^{|C|} n_x}$$

END FOR
END FOR

FIG. 3

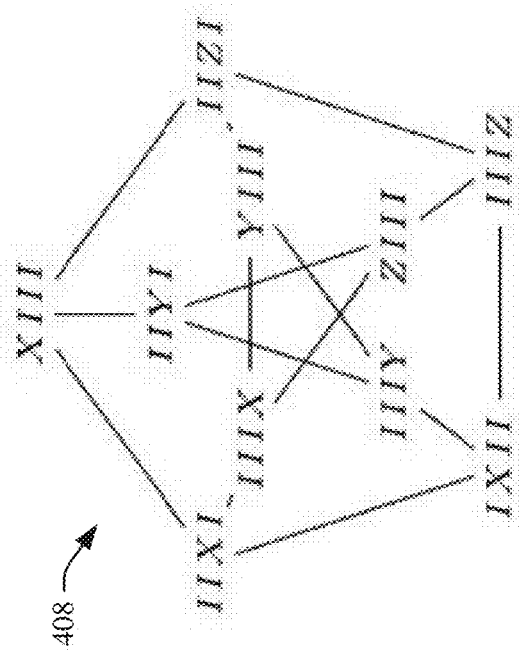
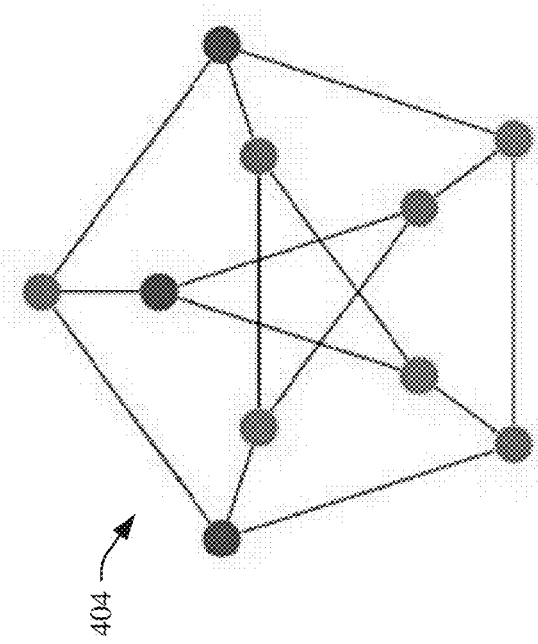
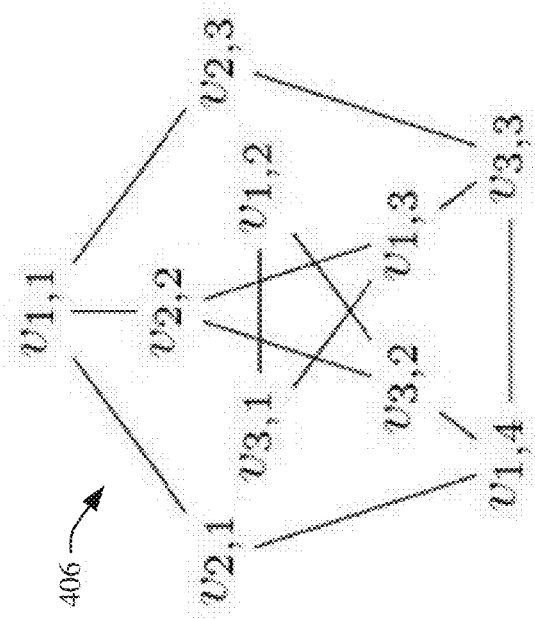
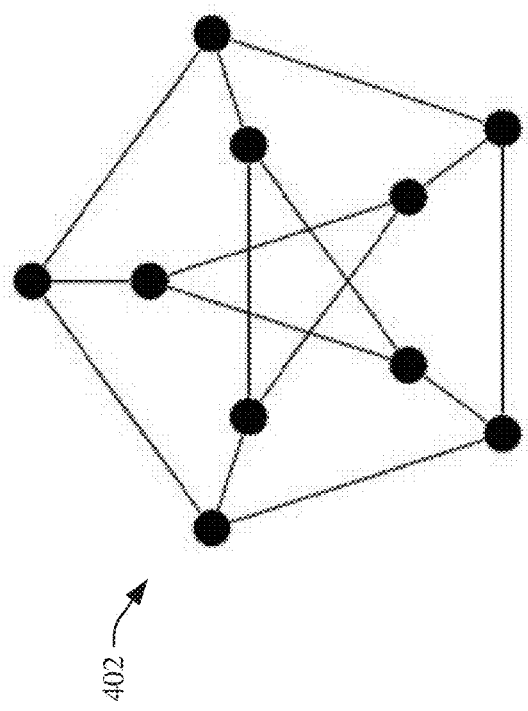
FIG. 4

Algorithm A Approximate Optimization of MaxCut using Quantum Relaxation and Rounding

Input: Graph $G = (V, E)$; Number of quantum measurements $S$; A quantum rounding subroutine $R$.
Output: Approximate solution $m \in \{-1, 1\}^{|V|}$ to MaxCut problem.

1: Color graph $G$ using Largest-Degree-First algorithm giving $C$ colors and partition $V = \cup_{c \in [C]} V_c$
2: Index vertices $v_{c,i}$ where $c \in [C]$ and $i \in [|V_c|]$
3: for color $c \in [C]$ do
4: $\quad$ Assign $n_c = \lceil |V_c|/3 \rceil$ qubits to variables $\{m_{c,i}\}_{i \in [|V_c|]}$
5: Define embedding $F : \{-1, 1\}^{|V|} \to D(\mathbb{C}^{2^n})$ where $n = \sum_{c \in [C]} n_c$
6: Define 2-local Hamiltonian $H = \sum_{(i,j) \in E} \frac{1}{3}(I - 3 \cdot P_{c,i} P_{c,j})$
7: Define an assignment $M_{V \to P} : v_{c,i} \mapsto P_{c,i}$ from vertices to single qubit Pauli Observables in $H$.
8: Obtain $\hat{\rho}_{\text{relax}}$, an approximation to the ground state of $H$, prepared by the quantum circuit $\mathcal{U}_{\text{relax}}$
9: Obtain the approximate solution $m = R(\mathcal{U}_{\text{relax}}, S, M_{V \to P})$
$\quad$ return $m$

FIG. 8

Algorithm B Magic State Rounding Subroutine

Input: An oracle $\mathcal{U}_{relax}$ which prepares $\tilde{\rho}_{relax}$; Number of quantum rounding steps $S$.
Output: Approximate solution $m \in \{-1, 1\}^{|V|}$ to MaxCut problem.

1: Initialize approximate solution $m = (1, 1, \ldots, 1)$
2: for quantum rounding $s \in [S]$ do
3:     Denote by $m'$ the configuration to be obtained
4:     Prepare $\tilde{\rho}_{relax}$ on quantum processor
5:     for qubit $q \in [n]$ do
6:         Uniformly at random pick $j \in [4]$
7:         Measure qubit $q$ in magic basis $\{\mu_j^+, \mu_j^-\}$
8:         Assign values in $m'$ associated with qubit $q$ according to measurement
9:     if $cut(m') > cut(m)$ then
10:        Replace $m$ with $m'$
return $m$

FIG. 9

Algorithm C Pauli Rounding Subroutine

Input: An oracle $\mathcal{U}_{relax}$ which prepares $\tilde{\rho}_{relax}$; Number of quantum rounding steps $S$. An assignment $v_{c,i} \mapsto P_{c,i}$ from vertices to Pauli Observables.

Output: Approximate solution $m \in \{-1, 1\}^{|V|}$ to MaxCut problem.

1: Initialize approximate solution $m = (1, 1, \ldots, 1)$
2: Define $S_q = \min(3, \max(|V|))$ to be the maximum number of variables assigned to any one qubit.
3: for $v_{c,i} \in H$ do
4:     Prepare $\tilde{\rho}_{relax}$ on quantum processor
5:     Using $S_q$ measurements, estimate $\text{Tr}(H \cdot P_{c,i})$
6:     if $\text{Tr}(H \cdot P_{c,i}) = 0$ then:
7:         Assign the value in $m$ associated with vertex $v_{c,i}$ uniformly at random
8:     else
9:         Assign the value in $m$ associated with vertex $v_{c,i}$ according to $\text{sign}(\text{Tr}(H \cdot P_{c,i}))$ return $m$

FIG. 10

MAX-CUT APPROXIMATE SOLUTION VIA QUANTUM RELAXATION

BACKGROUND

The subject disclosure relates to quantum computing, and more specifically to facilitating max-cut approximate solution via quantum relaxation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate max-cut approximate solution via quantum relaxation are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can access a graph having a set of vertices and a set of edges. In various aspects, the computer-executable components can further comprise a rounding component that can compute a max-cut approximate solution of the graph based on a quantum Hamiltonian relaxation of the graph.

According to one or more embodiments, the above-described system can be implemented as a computer-implemented method and/or computer program product.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates a flow diagram of an example, non-limiting algorithm that facilitates generation of a set of Pauli assignments based on a graph coloring in accordance with one or more embodiments described herein.

FIG. 4 illustrates a non-limiting example of Pauli assignments based on a graph coloring in accordance with one or more embodiments described herein.

FIGS. 8-10 illustrate example, non-limiting algorithms that can be implemented in various embodiments described herein.

DETAILED DESCRIPTION

Figure 1:
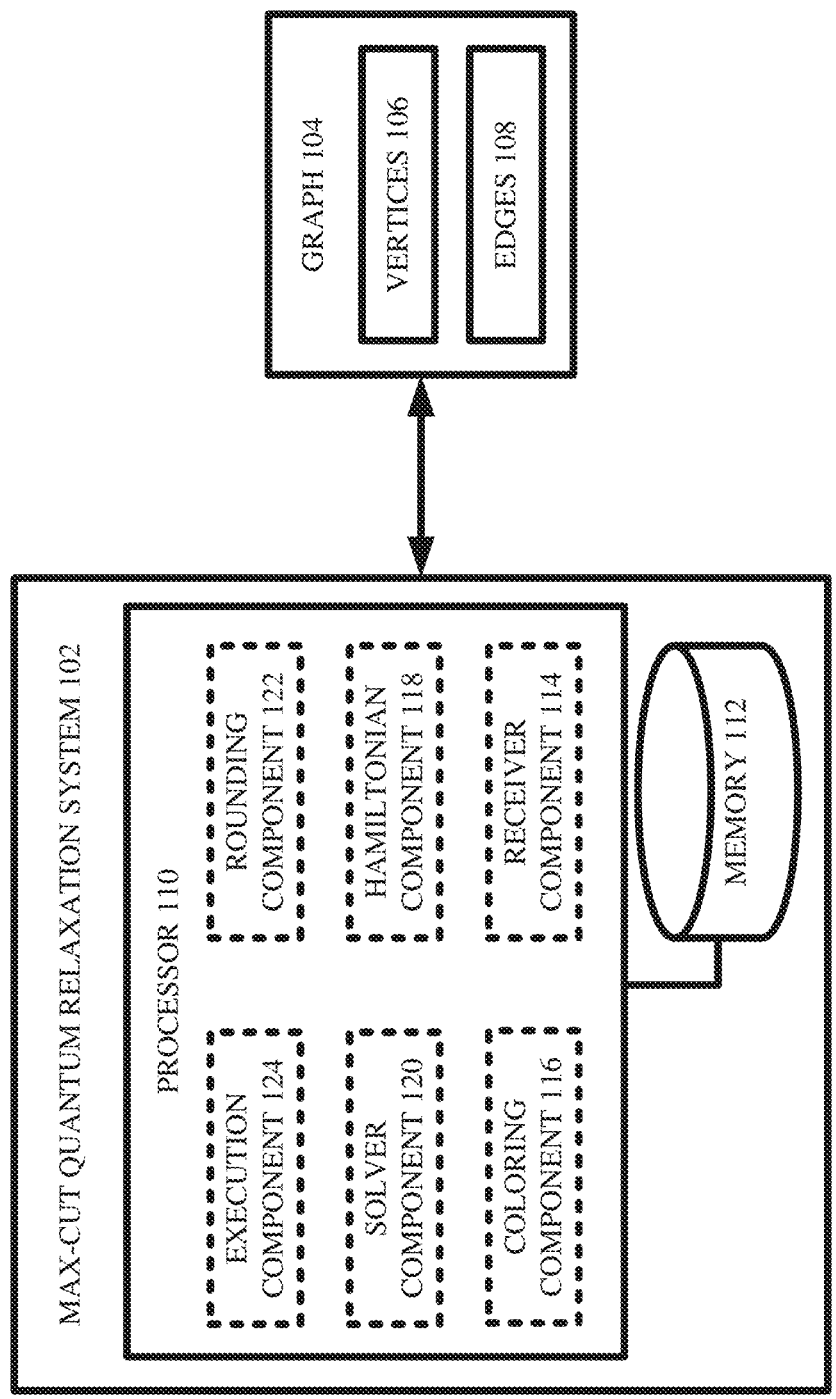
FIG. 1 illustrates a block diagram of an example, non-limiting system that facilitates max-cut approximate solution via quantum relaxation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

When given a graph having a set of vertices and a set of edges, max-cut is the problem of partitioning the set of vertices into two subsets, such that the number of edges having both vertices in different subsets is maximized (and/or such that the number of edges having both vertices in the same subset are minimized). Computing the max-cut of a graph is an NP-hard problem. Thus, computing the max-cut of a graph is inefficient and/or impractical when performed classically.

Some of this inefficiency and/or impracticality can be addressed by formulating the max-cut problem so that it can be processed by a quantum computer and/or a quantum simulator (e.g., by embedding classical binary variables into a quantum state and subsequently applying one or more quantum circuits to that quantum state). However, existing techniques for computing max-cut via quantum processing (e.g., quantum approximate optimization algorithm (QAOA)) rely on bijective mappings between the space of classical binary variables and the basis states of a set of qubits, which causes such existing techniques to yield cost functions that have classical maximum eigenstates. In other words, such existing techniques utilize quantum formulations that result in diagonal Hamiltonians, for which one does not need and/or make use of superposition and/or entanglement to prepare ground states. Because quantum advantage over classical computing is due to quantum superposition and/or quantum entanglement, such existing techniques are suboptimal.

The inventors of various embodiments described herein devised a solution to address this technical problem. More specifically, the present inventors devised a novel quantum formulation of max-cut that is based on commutative mappings between classical binary variables and qubit basis states that are based on quantum random access codes, which allows the construction of quantum Hamiltonian relaxations (e.g., non-diagonal and/or entangled Hamiltonians) having the same expectation values as classical max-cut cost functions. Accordingly, when given a graph, the teachings described herein can be implemented to compute a max-cut approximate solution for the graph, which max-cut approximate solution is more accurate and/or more quickly computed as compared to classical techniques, and which max-cut approximate solution is computed using fewer qubits as compared to existing quantum techniques.

Various embodiments described herein can be considered as a computerized tool (e.g., any suitable combination of computer-executable hardware and/or computer-executable software) that can electronically receive as input a graph and that can electronically compute as output a max-cut approximate solution for the inputted graph. Accordingly, such a computerized tool can, in some cases, be considered as a type of max-cut calculator. Such a computerized tool can, in various embodiments, comprise a receiver component, a coloring component, a Hamiltonian component, a solver component, and/or a rounding component.

In various embodiments, the receiver component of the computerized tool can electronically receive and/or otherwise electronically access a graph. In various aspects, the graph can include and/or otherwise be defined by a set of vertices and a set of edges. In various instances, the graph can exhibit any suitable number of vertices and/or any suitable number of edges that are coupled together in any suitable arrangement. In various cases, the receiver component can electronically retrieve and/or obtain the graph from any suitable centralized and/or decentralized database and/or computing device. Accordingly, other components of the computerized tool can electronically interact with (e.g., read, write, edit, manipulate) the graph.

In various embodiments, the coloring component of the computerized tool can electronically compute a coloring of the graph and can electronically assign Pauli operators to the vertices of the graph based on the coloring. More specifically, the coloring component can electronically assign to each vertex of the graph a color (e.g., a subset, a partition), such that the total number of colors is minimized and such that every edge of the graph has two differently-colored vertices. Each given color can have any suitable cardinality (e.g., can include any suitable number of vertices). Furthermore, for each given color, the cardinality of the given color can be divided by three, the quotient of such division can be rounded up, and the result of such rounding can be considered as a minimum number of qubits that can be used to represent the vertices that have the given color. In various instances, for a given color that is represented by a given number of qubits, there exists a set of unique weight-1 Pauli operators that are supported by the given number of qubits (e.g., if the given number of qubits for a given color is n for any suitable positive integer n, then a weight-1 Pauli operator that is supported by n qubits is equal to the tensor product of one Pauli operator and n−1 identity operators). As those having ordinary skill in the art will appreciate, such set of unique weight-1 Pauli operators can have a cardinality that is three times the given number of qubits. Accordingly, the coloring component can assign to each vertex in the given color a unique weight-1 Pauli operator from that set. In various instances, the coloring component can perform this for each color of the graph, with the result being that each vertex of the graph can be assigned a weight-1 Pauli operator. In various cases, the coloring component can electronically multiply (e.g., via tensor product multiplication) the weight-1 Pauli operator of each vertex on the left and/or right by any suitable string of identity operators, such that all the weight-1 Pauli operators assigned to the vertices of the graph operate on the same number of qubits.

In various embodiments, the Hamiltonian component of the computerized tool can electronically compute a quantum Hamiltonian relaxation based on the weight-1 Pauli operators that are assigned to the vertices of the graph. More specifically, the quantum Hamiltonian relaxation can be equal to and/or otherwise based on the following formula:

$$H = \sum_{e \in E} \frac{1}{2}(I - 3 \cdot O_e),$$

where H represents the quantum Hamiltonian relaxation (e.g., a non-diagonal Hamiltonian), where E represents the set of edges in the graph, where e represents an edge in the graph, where $O_e$ represents the matrix product between the weight-1 Pauli operators that have been assigned to the two vertices of the edge e, and where I represents a suitably-sized identity operator.

In various embodiments, the solver component of the computerized tool can electronically access and/or otherwise electronically control a quantum computer and/or a quantum simulator. Accordingly, in various aspects, the solver component can electronically compute, via execution of the quantum computer and/or the quantum simulator, a relaxed quantum state of the quantum Hamiltonian relaxation. As those having ordinary skill in the art will appreciate, the quantum computer and/or the quantum simulator can employ any suitable quantum processing technique for computing the relaxed quantum state (e.g., variational eigensolvers, quantum phase estimation, approximation algorithms for quantum Hamiltonians, and/or quantum imaginary time evolution).

In various embodiments, the rounding component of the computerized tool can electronically compute a max-cut approximate solution for the graph, based on the relaxed quantum state. More specifically, the rounding component can electronically apply magic state rounding and/or Pauli rounding, which are described in more detail herein, to convert the relaxed quantum state into a classical binary string, where the classical binary string includes a binary value for each vertex in the graph. In various instances, the binary value of a given vertex can be considered as identifying to which of two different subsets the vertex belongs. Accordingly, the classical binary string can be considered as representing an approximation of the max-cut of the graph. In other words, the classical binary string can be considered as the max-cut approximate solution.

Thus, various embodiments described herein can include a computerized tool that can receive as input a graph and that can compute as output a max-cut approximate solution of the graph, where the max-cut approximate solution is based on a quantum Hamiltonian relaxation of the graph. Such a computerized tool can compute the max-cut approximate solution more efficiently and/or more quickly than classical computing techniques. Furthermore, such a computerized tool can compute the max-cut approximate solution using significantly fewer logical qubits (e.g., using one-third as many qubits) as existing quantum processing techniques for computing max-cut (e.g., QAOA).

Various embodiments of the invention can be employed to use hardware and/or software to solve problems that are highly technical in nature (e.g., to facilitate max-cut approximate solution via quantum relaxation), that are not abstract and that cannot be performed as a set of mental acts by a human. Further, some of the processes performed can be performed by a specialized computer (e.g., quantum computer, quantum simulator). In various aspects, some defined tasks associated with various embodiments of the invention can include: accessing, by a device operatively coupled to a processor, a graph having a set of vertices and a set of edges; and computing, by the device, a max-cut approximate solution of the graph based on a quantum Hamiltonian relaxation of the graph. More specifically, in various instances, such defined tasks can further include: computing, by the device, a coloring of the graph, such that any two vertices of the graph that are linked together by an edge have different colors; assigning, by the device, weight-1 Pauli operators to the set of vertices based on the coloring; generating, by the device, the quantum Hamiltonian relaxation based on the weight-1 Pauli operators; identifying, by the device and via execution of a quantum computer or a quantum simulator, a relaxed quantum state of the quantum Hamiltonian relaxation; and computing, by the device, the max-cut approximate solution by applying magic state rounding or Pauli rounding to the relaxed quantum state.

Neither the human mind nor a human with pen and paper can perform such defined tasks. Instead, various embodiments described herein are inherently and inextricably tied to computer technology and cannot be implemented outside of a computing environment. After all, a quantum computer and/or a quantum simulator are specialized pieces of computing equipment that cannot exist outside of a computing environment. Accordingly, a computerized tool that executes a quantum computer and/or a quantum simulator to calculate a max-cut approximate solution of a given graph is likewise a specialized piece of computing equipment that cannot be implemented in any sensible, practical, and/or reasonable way without computers.

In various instances, the teachings described herein can be integrated into a practical application. Indeed, as described herein, various embodiments of the invention, which can take the form of systems and/or computer-implemented methods, can be considered as a computerized tool that can electronically receive as input a graph and that can electronically calculate a max-cut approximate solution for the graph based on a quantum Hamiltonian relaxation of the graph. More specifically, the computerized tool can: compute a coloring of the graph, such that each edge of the graph has two differently-colored vertices; assign a unique weight-1 Pauli operator to each vertex of the graph based on the color of the vertex; compute a quantum Hamiltonian relaxation (e.g., a non-diagonal and/or entangled Hamiltonian) based on the weight-1 Pauli operators, identify a relaxed quantum state of the quantum Hamiltonian relaxation by executing a quantum computer and/or a quantum simulator (e.g., variational quantum eigensolver (VQE)), and calculate the max-cut approximate solution by applying magic state rounding and/or Pauli rounding to the relaxed quantum state. The present inventors confirmed through numerical experiments/simulations that such a computerized tool can compute the max-cut approximate solution faster and/or more efficiently than classical computing techniques. Moreover, the present inventors further confirmed through numerical experiments that such a computerized tool can compute the max-cut approximate solution using far fewer qubits (e.g., one-third as many qubits) as compared to existing quantum processing techniques (e.g., as compared to QAOA). Thus, such a computerized tool can be considered as being able to solve a max-cut problem without being impeded by combinatorial explosion, unlike existing classical processing techniques. Moreover, such a computerized tool can further be considered as harnessing full advantage of quantum entanglement (e.g., utilizing non-diagonal Hamiltonians as opposed to diagonal Hamiltonians) so as to solve the max-cut problem using fewer qubits, unlike existing quantum processing techniques. Accordingly, such a computerized tool represents a concrete and tangible technical improvement in the field of quantum computing, and thus such a computerized tool certainly constitutes a useful and practical application of computers (e.g., the computerized tool can be considered as a new and improved max-cut calculator).

It should be appreciated that the figures and the herein disclosure describe non-limiting examples of various embodiments of the invention.

FIG. 1 illustrates a block diagram of an example, non-limiting system 100 that can facilitate max-cut approximate solution via quantum relaxation in accordance with one or more embodiments described herein. As shown, a max-cut quantum relaxation system 102 can be electronically integrated, via any suitable wired and/or wireless electronic connections, with a graph 104.

In various embodiments, the graph 104 can be any suitable graph that comprises and/or is otherwise defined by a set of vertices 106 and a set of edges 108. In various aspects, the set of vertices 106 can include any suitable number of vertices. In various instances, the set of edges 108 can include any suitable number of edges. In various aspects, each of the set of edges 108 can be weighted and/or unweighted, as desired. In various cases, the graph 104 can be considered as representing any suitable piece and/or collection of electronic data. For example, the graph 104 can represent a circuit architecture (e.g., useful in Very Large Scale Integration (VLSI) electronic design). As another example, the graph 104 can represent a computing network and/or communication network. As still another example, the graph 104 can represent ordering and/or angles of ply composites used to construct a structure (e.g., an airplane wing and/or fuselage).

In any case, it can be desired to compute a max-cut approximate solution for the graph 104. In other words, it can be desired to separate the set of vertices 106 into two different subsets of vertices, such that the number of edges in the set of edges 108 whose vertices belong to different subsets is maximized and/or such the number of edges in the set of edges 108 whose vertices belong to the same subset is minimized. In various instances, the max-cut quantum relaxation system 102 can facilitate computation of such max-cut approximate solution, as described herein.

In various embodiments, the max-cut quantum relaxation system 102 can comprise a processor 110 (e.g., computer processing unit, microprocessor) and a computer-readable memory 112 that is operably connected to the processor 110. The memory 112 can store computer-executable instructions which, upon execution by the processor 110, can cause the processor 110 and/or other components of the max-cut quantum relaxation system 102 (e.g., receiver component 114, coloring component 116, Hamiltonian component 118, solver component 120, rounding component 122, execution component 124) to perform one or more acts. In various embodiments, the memory 112 can store computer-executable components (e.g., receiver component 114, coloring component 116, Hamiltonian component 118, solver component 120, rounding component 122, execution component 124), and the processor 110 can execute the computer-executable components.

In various embodiments, the max-cut quantum relaxation system 102 can comprise a receiver component 114. In various aspects, the receiver component 114 can electronically receive, electronically retrieve, and/or otherwise electronically access the graph 104 from any suitable centralized and/or decentralized data structure (not shown), whether remote from and/or local to the receiver component 114. In various other instances, the receiver component 114 can electronically obtain the graph 104 from any other suitable computing device (not shown) and/or from any suitable input interface (not shown). In any case, the receiver component 114 can access the graph 104, such that other components of the max-cut quantum relaxation system 102 can electronically interact with the graph 104.

In various embodiments, the max-cut quantum relaxation system 102 can further comprise a coloring component 116. In various cases, as described herein, the coloring component 116 can electronically compute a coloring of the graph 104 and can electronically assign weight-1 Pauli-operators to each of the set of vertices 106 based on the coloring. In various embodiments, the max-cut quantum relaxation system 102 can further comprise a Hamiltonian component 118. In various cases, as described herein, the Hamiltonian component 118 can electronically compute a quantum Hamiltonian relaxation (e.g., a non-diagonal and/or entangled Hamiltonian) based on the weight-1 Pauli operators assigned by the coloring component 116. In various embodiments, the max-cut quantum relaxation system 102 can further comprise a solver component 120. In various cases, as described herein, the solver component 120 can electronically identify a relaxed quantum state of the quantum Hamiltonian relaxation, by executing the quantum Hamiltonian relaxation on a quantum computer and/or a quantum simulator. In various embodiments, the max-cut quantum relaxation system 102 can further comprise a rounding component 122. In various cases, as described herein, the rounding component 122 can electronically calculate a max-cut approximate solution for the graph 104, by applying magic state rounding and/or Pauli rounding to the relaxed quantum state. In various embodiments, the max-cut quantum relaxation system 102 can further comprise an execution component 124. In various cases, as described herein, the execution component 124 can electronically initiate any suitable computerized action based on the max-cut approximate solution (e.g., can electronically transmit the max-cut approximate solution to any suitable computing device, can electronically render the max-cut approximate solution on any suitable monitor/display/screen).

To help understand various aspects of the invention, consider the following mathematical discussion that recalls and/or formulates the max-cut problem. Consider a graph $G=(V,E)$ with $|V|$ vertices, labeled $\{v_i\}$, and $|E|$ edges, labeled $\{e_{i,j}\}$, $i,j \in [|V|]$. Here, the graph $G$ can be considered as the graph 104, the set of vertices $V$ can be considered as the set of vertices 106, and the set of edges $E$ can be considered as the set of edges 108. The degree of the graph can be $\deg(G)$. Accordingly, the max-cut problem can be defined by the following Equation 1:

$$\max_{m \in \{-1,1\}^{|V|}} \text{cut}(m) = \max_{m \in \{-1,1\}^{|V|}} \sum_{e_{i,j} \in E} \frac{1}{2}(1 - m_i m_j)$$

where m can represent a binary string whose length (e.g., whose number of bits) can be equal to the number of vertices in the graph. Accordingly, each bit of m can be considered as indicating to which of two different subsets a particular vertex of the graph belongs. Thus, the max-cut problem can be considered as identifying which m maximizes the above expression. Let m* denote the binary string that maximizes cut(m).

In various cases, a quantum Hamiltonian relaxation can be formulated for the max-cut problem as follows: When given a graph $G=(V,E)$, there exists an embedding defined by the following Equation 2:

$$F: \{-1,1\}^{|V|} \to \mathcal{D}(\mathbb{C}^{2^n})$$

where F represents the embedding, where $\{-1,1\}^{|V|}$ represents a binary string of length $|V|$, and where $\mathcal{D}(\mathbb{C}^{2^n})$ represents a quantum state of n qubits, and there also exists a Hamiltonian H on n qubits, such that the embedding F and the Hamiltonian H, in expectation, commute with the max-cut function cut(m). In other words, for all $m \in \{-1,1\}^{|V|}$, the following Equation 3 can hold true:

$$\text{Tr}(H \cdot F(m)) = \text{cut}(m)$$

where Tr represents the trace function. In various aspects, the Hamiltonian H can be composed of (up to a multiple of the identity operator) a linear combination of Pauli operators of weight-2. Moreover, the construction of H and F can be performed in time complexity $\tilde{O}(|V|)$.

To help understand how to construct H and F, consider the following discussion of quantum random access codes. A quantum random access code (QRAC) can allow more than one binary variable to be encoded per qubit at the expense of retrieval of each binary-variable value becoming probabilistic. The optimization of these two parameters can be constrained by Nayak's bound, which extends Holevo's bound. Consider the (3,1,p) QRAC, which is given by the following Equation 4, that encodes three binary variables $m = \{m_i\}_{i \in [3]}$ into one qubit $\mathcal{D}(\mathbb{C}^2)$:

$$f(m) = \frac{1}{2}\left(I + \frac{1}{\sqrt{3}}(m_1 X + m_2 Y + m_3 Z)\right)$$

where m in the Equation 4 represents a bit string of length three, where $m_1$, $m_2$, and $m_3$ respectively represent the three bits of m, where f(m) represents the (3,1,p) encoding of m, where X represents the Pauli-X operator (which is a two-by-two matrix), where Y represents the Pauli-Y operator (which is a two-by-two matrix), and where Z represents the Pauli-Z operator (which is a two-by-two matrix). As used throughout this disclosure, I represents the identity operator. As those having ordinary skill in the art will appreciate, the dimensionality of I can vary based on context (e.g., if I is being added and/or subtracted from a two-by-two matrix, then I in such case can have dimensions two-by-two; if I is instead being added and/or subtracted from a $2^n$-by-$2^n$ matrix for any suitable positive integer n, then I in such case can have dimensions $2^n$-by-$2^n$). From the Equation 4, it can be shown that, with probability $$p = \frac{1}{2} + \frac{1}{2\sqrt{3}},$$

a given binary variable can be recovered upon measuring in a corresponding Pauli basis. For example, $$Tr(X \cdot f(m)) = \frac{1}{\sqrt{3}} m_1,$$

hence, if one writes $\pi_X^+$ to be projection onto the +1 eigenspace of X, then $$Tr(\pi_X^+ \cdot f(+1, m_2, m_3)) = \frac{1}{2} + \frac{1}{2\sqrt{3}}.$$

As explained herein, QRACs in general, and the (3,1,p) QRAC given by the Equation 4 in particular, can be used as tools to construct a quantum Hamiltonian relaxation of the max-cut problem.

Figure 2:
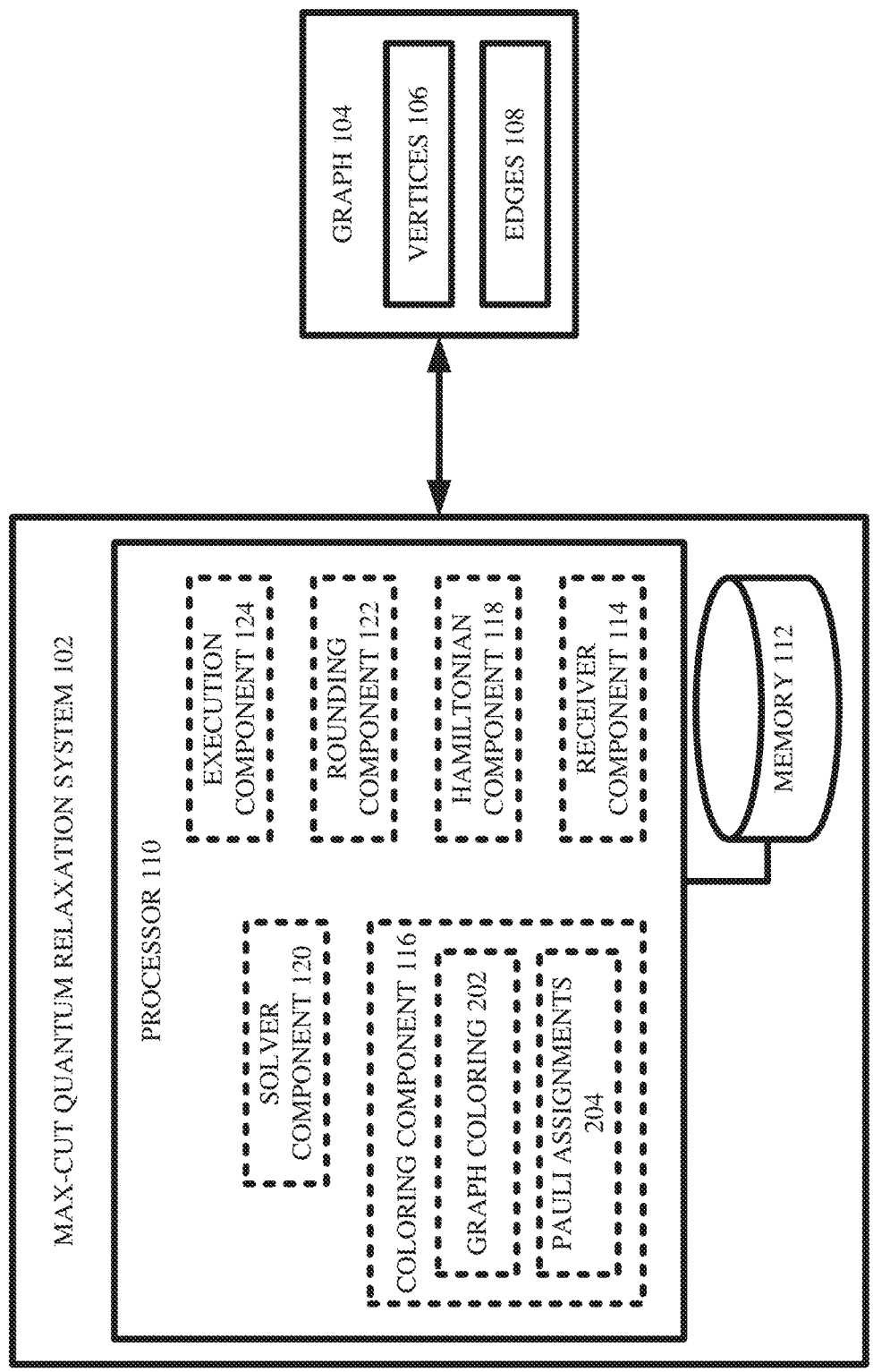
FIG. 2 illustrates a block diagram of an example, non-limiting system including a graph coloring and a set of Pauli assignments that facilitates max-cut approximate solution via quantum relaxation in accordance with one or more embodiments described herein.

FIG. 2 illustrates a block diagram of an example, non-limiting system 200 including a graph coloring and a set of Pauli assignments that can facilitate max-cut approximate solution via quantum relaxation in accordance with one or more embodiments described herein. As shown, the system 200 can, in various cases, comprise the same components as the system 100, and can further comprise a graph coloring 202 and a set of Pauli assignments 204.

In various embodiments, the coloring component 116 can electronically calculate the graph coloring 202 for the graph 104, and the coloring component 116 can electronically generate the set of Pauli assignments 204 based on the graph coloring 202. In various aspects, the graph coloring 202 can be considered as an assignment of each vertex in the set of vertices 106 to a respective color (e.g., to a respective partition), where the total number of colors in the graph coloring 202 is minimized, and where each edge in the set of edges 108 has two differently-colored vertices. In various instances, the coloring component 116 can implement any suitable coloring technique to identify and/or otherwise generate the graph coloring 202.

As a non-limiting example, the coloring component 116 can implement a large-degree first (LDF) methodology to compute the graph coloring 202. In various cases, LDF can find a coloring $\{V_c\}_{c \in [C]}$ of the vertices V into C colors, such that if $e_{i,j} \in E$ then the vertices $v_i, v_j$ are associated with different partitions $V_{c(i)}, V_{c(j)}$. In a compact form, this can be expressed as: $e_{i,j} \in E \rightarrow c(i) \neq c(j)$. LDF can have time-complexity $O(|V|\log(|V|)+\deg(G)|V|)$ and can perform such that the total number of colors satisfies $C \leq \deg(G)+1$.

In various aspects, the coloring component 116 can electronically generate the set of Pauli assignments 204 based on the graph coloring 202. In other words, the coloring component 116 can electronically assign to each vertex in the set of vertices 106 a respectively corresponding Pauli operator based on the color of the vertex. More specifically, each color c of the graph coloring 202 can be associated with $n_c$ qubits, such that $n_c = \lceil |V_c|/3 \rceil$, and the coloring component 116 can assign and/or otherwise associate to each vertex of the color c a weight-1 Pauli operator that is supported on the respective $n_c$ qubits. Note that the total number of qubits used here (e.g., the total sum of $n_c$ for all c) is reduced up to a factor ⅓ with respect to the standard QAOA formulation. Furthermore, note that up to two of the possible $3n_c$ Pauli operators for any given color c can go unassigned by the coloring component 116.

For further clarification regarding how the coloring component 116 can generate the graph coloring 202 and the set of Pauli assignments 204, consider FIG. 3.

FIG. 3 illustrates a flow diagram of an example, non-limiting algorithm 300 that can facilitate generation of the set of Pauli assignments 204 based on the graph coloring 202 in accordance with one or more embodiments described herein.

As shown, the algorithm 300 can include accessing, by a device (e.g., via 114) operatively coupled to a processor, a graph G={V,E}, where V can be a set of vertices of the graph G, and where E can be a set of edges of the graph G. Again, G can represent the graph 104, V can represent the set of vertices 106, and E can represent the set of edges 108.

In various aspects, the algorithm 300 can further include coloring, by the device (e.g., via 116), the graph G such that any two vertices in V that are coupled together by an edge in E have different colors. As mentioned above, this coloring can be accomplished by any suitable graph coloring technique, such as LDF. In various cases, such coloring can yield a set of colors C and a plurality of subsets and/or partitions of vertices $V_i$ for $i \in [|C|]$, where $V = \cup_{i=1}^{|C|} V_i$ and $|V| = \Sigma_{i=1}^{|C|} |V_i|$.

In various instances, the algorithm 300 can further include iterating, by the device (e.g., via 116), through each color i in the set of colors C (e.g., such as via a for-loop FOR i=1:|C|). For a given color i, $$n_i = \left\lceil \frac{|V_i|}{3} \right\rceil$$

can be computed, where $n_i$ can represent the minimum number of logical qubits that can be used to represent the vertices that have the color i (e.g., when assuming that a (3,1,p) QRAC will be used). In various aspects, there can exist $3n_i$ unique weight-1 Pauli operators that are supported by $n_i$ qubits, with each of such weight-1 Pauli operators being a tensor product between one two-by-two Pauli operator (e.g., X, Y, Z) and $n_i-1$ two-by-two identity operators. Accordingly, $Q_i$ can denote that set of $3n_i$ unique weight-1 Pauli operators.

As shown, the algorithm 300 can, in various aspects, further include iterating, by the device (e.g., via 116), through each vertex that has the color i (e.g., such as via a for-loop FOR j=1: $|V_i|$). For a given vertex j that has the color i, the vertex j can be assigned any weight-1 Pauli operator $P_{i,j}$ that is in the set $Q_i$. After such assignment, the weight-1 Pauli operator $P_{i,j}$ can be removed and/or subtracted from the set $Q_i$, to prevent $P_{i,j}$ from being duplicatively assigned to any other vertex that has the color i. Accordingly, each vertex in the graph G can be assigned a weight-1 Pauli operator in this manner.

Note that, in some cases, different colors in C can be assigned different numbers of vertices, which can cause the number of logical qubits needed to represent such different colors to likewise be different. Thus, it can be the case that different vertices of the graph G are assigned differently-sized weight-1 Pauli operators. To address such disparate sizing, the algorithm 300 can include subsequently iterating through each given vertex in the graph G and resizing the weight-1 Pauli operator assigned to the given vertex by applying multiples of the two-by-two identity operator to the left and/or right of the weight-1 Pauli operator. More specifically, as shown, the algorithm 300 can include iterating, by the device (e.g., via 116), through each color i in the set of colors C (e.g., such as via a for-loop FOR i=1:|C|) and through each vertex j in the color i (e.g., such as via a for-loop FOR j=1:|V$_i$|). For a given vertex j in the color i, $P_{i,j}$ can be resized by applying $\Sigma_{x=1}^{i-1} n_x$ two-by-two identity operators to the left of $P_{i,j}$ and by applying $\Sigma_{x=i+1}^{|C|} n_x$ two-by-two identity operators to the right of $P_{i,j}$. Note that $\Sigma_{x=1}^{i-1} n_x = 0$ when i=1, and note that $\Sigma_{x=i+1}^{|C|} n_x = 0$ when i=|C|. Accordingly, this can cause each $P_{i,j}$ to be resized so as to operate on $\Sigma_{x=1}^{|C|} n_x$ qubits.

In any case, the coloring component 116 can generate the set of Pauli assignments 204 (e.g., can assign a unique weight-1 Pauli operator to each vertex in the set of vertices 106) based on the graph coloring 202.

FIG. 4 illustrates a non-limiting example 400 of a set of Pauli assignments based on a graph coloring in accordance with one or more embodiments described herein. As shown, numeral 402 depicts a non-limiting example of the graph 104, where each dark circle represents a vertex, and where each line represents an edge.

In various cases, numeral 404 depicts a non-limiting example of the graph coloring 202, where each vertex of the graph has been assigned to a color such that each edge has two differently-colored vertices and such that the total number of colors is minimized. As shown in this non-limiting example, four vertices can be assigned to a first color (e.g., brown), three vertices can be assigned to a second color (e.g., blue), and three vertices can be assigned to a third color (e.g., green).

Those having ordinary skill in the art will appreciate that the numeral 404 is shown for explanatory purposes only and that the technique of graph coloring need not require actually rendering vertices of a graph in their assigned colors. Instead, graph coloring can be considered as separating the vertices of a graph into different subsets/partitions. Accordingly, numeral 406 depicts an alternative non-limiting example representation of the graph coloring 202, where each vertex is assigned a color index (e.g., to distinguish the vertex from vertices that are in other colors, meaning other subsets/partitions) and an identifier index (e.g., to distinguish the vertex from other vertices that are in the same color, meaning the same subset/partition). Thus, the vertex $v_{1,1}$ can be considered as representing the first vertex assigned to the first color (e.g., brown), the vertex $v_{1,2}$ can be considered as representing the second vertex assigned to the first color (e.g., brown), the vertex $v_{1,3}$ can be considered as representing the third vertex assigned to the first color (e.g., brown), and the vertex $v_{1,4}$ can be considered as representing the fourth vertex assigned to the first color (e.g., brown). Similarly, the vertex $v_{2,1}$ can be considered as representing the first vertex assigned to the second color (e.g., blue), the vertex $v_{2,2}$ can be considered as representing the second vertex assigned to the second color (e.g., blue), the vertex $v_{2,3}$ can be considered as representing the third vertex assigned to the second color (e.g., blue). Likewise, the vertex $v_{3,1}$ can be considered as representing the first vertex assigned to the third color (e.g., green), the vertex $v_{3,2}$ can be considered as representing the second vertex assigned to the third color (e.g., green), the vertex $v_{3,3}$ can be considered as representing the third vertex assigned to the third color (e.g., green).

In various aspects, numeral 408 depicts a non-limiting example of the set of Pauli assignments 204, where each vertex of the graph has been assigned a respective and/or unique weight-1 Pauli operator based upon its color.

Figure 5:
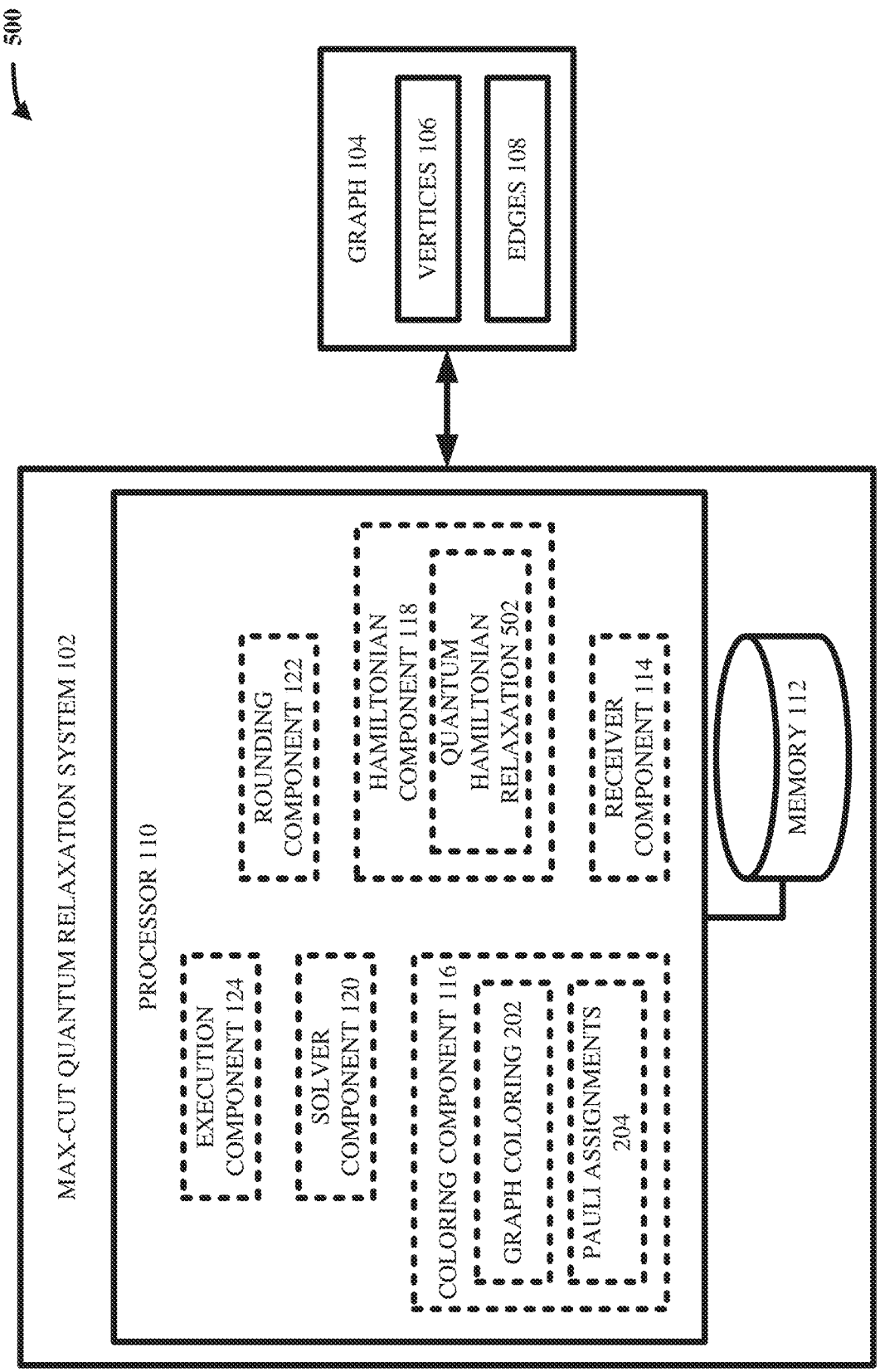
FIG. 5 illustrates a block diagram of an example, non-limiting system including a quantum Hamiltonian relaxation that facilitates max-cut approximate solution via quantum relaxation in accordance with one or more embodiments described herein.

FIG. 5 illustrates a block diagram of an example, non-limiting system 500 including a quantum Hamiltonian relaxation that can facilitate max-cut approximate solution via quantum relaxation in accordance with one or more embodiments described herein. As shown, the system 500 can, in some cases, comprise the same components as the system 200, and can further comprise a quantum Hamiltonian relaxation 502.

In various embodiments, the Hamiltonian component 118 can electronically compute and/or calculate the quantum Hamiltonian relaxation 502, based on the set of Pauli assignments 204. In various aspects, the quantum Hamiltonian relaxation 502 can be considered as a non-diagonal and/or entangled Hamiltonian whose expectation value can be equal to and/or otherwise commute with the max-cut of the graph 104. More specifically, for each edge e with associated vertices $v_{c,i}$ and $v_{c',i'}$ (note that c≠c'), the Hamiltonian component 118 can compute a weight-2 Pauli operator $O_e = P_{c,i} P_{c',i'}$, where $P_{c,i}$ can represent the weight-1 Pauli operator associated with a vertex $v_{c,i}$, where i∈[|V$_c$|]. Accordingly, the quantum Hamiltonian relaxation 502 can be given by and/or otherwise based on the following Equation 5:

$$H = \sum_{e \in E} \frac{1}{2}(I - 3 \cdot O_e)$$

which can act on $\Sigma_{x=1}^{|C|} n_x$ qubits, where H can represent the quantum Hamiltonian relaxation 502.

To help further understand various embodiments of the invention, consider the following discussion of the embedding F. Consider a vertex $v_{c,i}$ and the associated variable $m_{c,i}$. There are at most two other vertices $v_{c,j}$ and $v_{c,k}$ (with associated binary variables $m_{c,j}$ and $m_{c,k}$) such that the Pauli operators $P_{c,i}, P_{c,j}, P_{c,k}$ are all supported on the same qubit. Thus, this qubit can be indexed and/or referred to as q. Note that, if fewer than two such vertices exist (e.g., because 3∤|V$_c$|), then dummy variables $m_{c,j}$ and $m_{c,k}$ can be introduced as required, and the values of such dummy variables can be fixed to be +1. The values of the variables $m_{c,i}, m_{c,j}, m_{c,k}$ can then be encoded into the qubit indexed q using the function f from the Equation 4. Therefore, the following Equation 6 holds true:

$$Tr(P_{c,i} \cdot f(m_{c,i}, m_{c,j}, m_{c,k})) = \frac{1}{\sqrt{3}} m_{c,i}$$

Accordingly, this procedure can be applied to all vertices so as to provide a construction for the embedding F.

The commutation of the Equation 3 can be obtained by combining the Equation 1, the Equation 5, and the following Equation 7 (where the Equation 7 is implied by the Equation 6 for an edge e with vertices $v_{c,i}$ and $v_{c',i'}$):

$$Tr(O_e \cdot F(m)) = \frac{1}{3} m_{c,i} \cdot m_{c',i'}$$

Accordingly, this in conjunction with the Equation 5 can yield the commutative map of the Equation 3.

Figure 6:
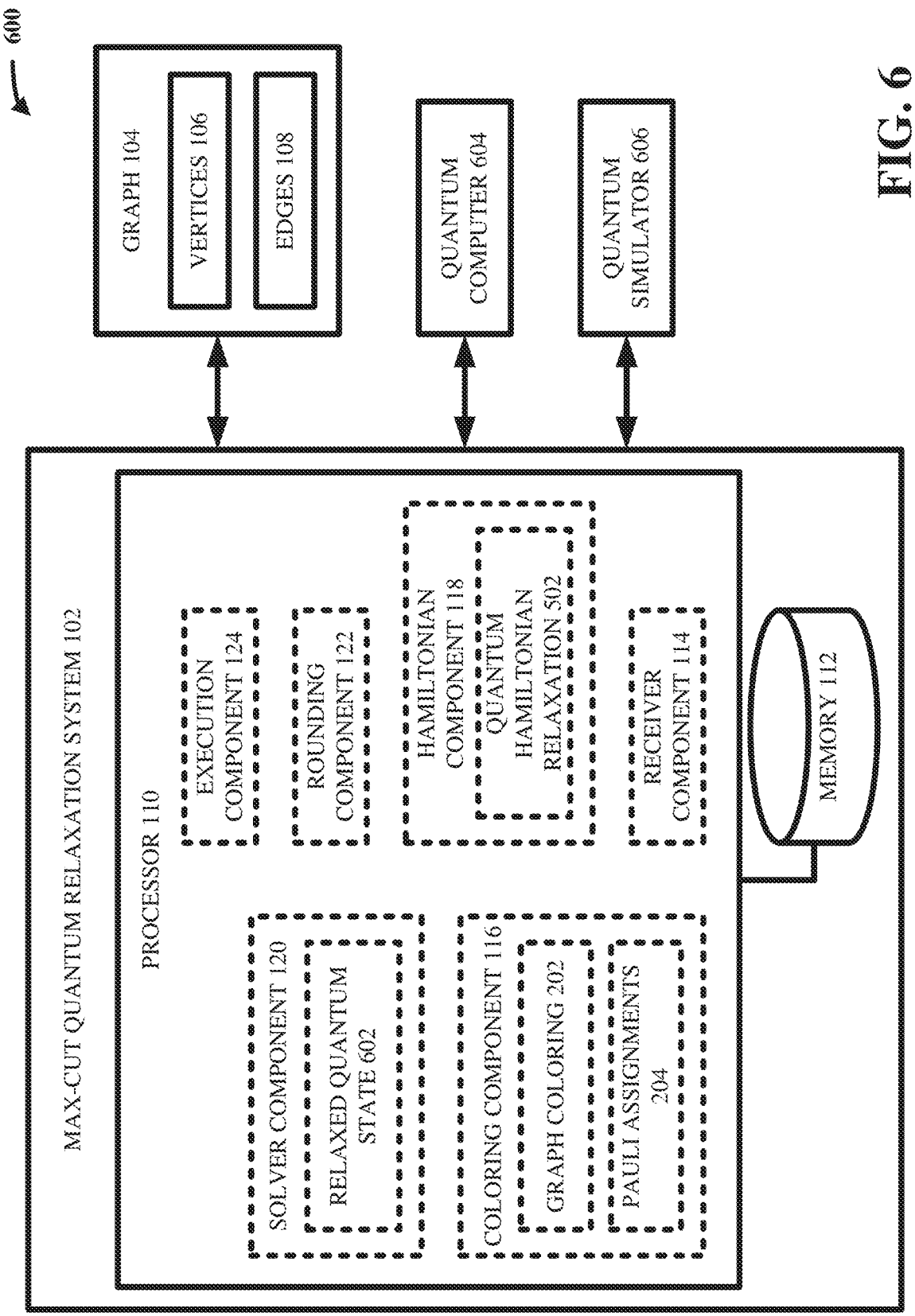
FIG. 6 illustrates a block diagram of an example, non-limiting system including a relaxed quantum state that facilitates max-cut approximate solution via quantum relaxation in accordance with one or more embodiments described herein.

FIG. 6 illustrates a block diagram of an example, non-limiting system 600 including a relaxed quantum state that can facilitate max-cut approximate solution via quantum relaxation in accordance with one or more embodiments described herein. As shown, the system 600 can, in some cases, comprise the same components as the system 500, and can further comprise a relaxed quantum state 602, a quantum computer 604, and/or a quantum simulator 606.

In various embodiments, solver component 120 can electronically access and/or otherwise electronically control a quantum computer 604 and/or a quantum simulator 606. In various aspects, the quantum computer 604 and/or the quantum simulator 606 can exhibit any suitable structures and/or architectures for performing and/or simulating quantum processing. For example, the quantum computer 604 and/or the quantum simulator 606 can be variational quantum eigensolvers. As another example, the quantum computer 604 and/or the quantum simulator 606 can be quantum phase estimators. As still another example, the quantum computer 604 and/or the quantum simulator 606 can implement any other suitable quantum processing technique, such as quantum Hamiltonian approximation or quantum imaginary time evolution. In any case, the solver component 120 can electronically execute the quantum computer 604 and/or the quantum simulator 606 with respect to the quantum Hamiltonian relaxation 502, which can yield as a result the relaxed quantum state 602. In various instances, the relaxed quantum state 602 can be denoted as $\rho_{relax}$ and can be considered as the highest-energy state associated with the quantum Hamiltonian relaxation 502 (e.g., $\rho_{relax}$ can be considered as the highest-energy state of H). Note that the highest-energy state can be mapped to the ground state if H→−H.

Figure 7:
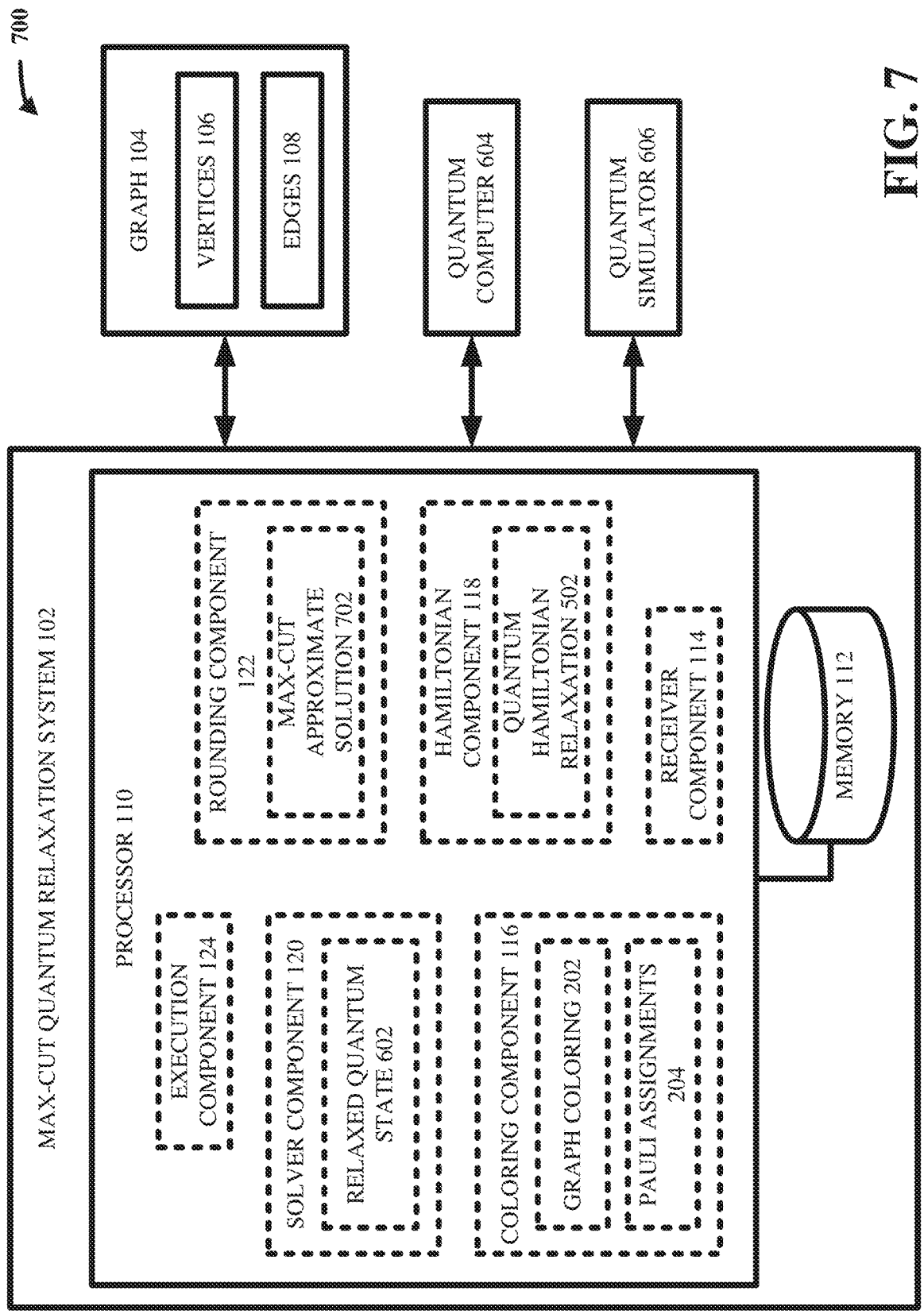
FIG. 7 illustrates a block diagram of an example, non-limiting system including a max-cut approximate solution that facilitates max-cut approximate solution via quantum relaxation in accordance with one or more embodiments described herein.

FIG. 7 illustrates a block diagram of an example, non-limiting system 700 including a max-cut approximate solution that can facilitate max-cut approximate solution via quantum relaxation in accordance with one or more embodiments described herein. As shown, the system 700 can, in some cases, comprise the same components as the system 600, and can further comprise a max-cut approximate solution 702.

In various embodiments, the rounding component 122 can electronically compute and/or calculate the max-cut approximate solution 702 based on the relaxed quantum state 602. In various aspects, the max-cut approximate solution 702 can be considered as a bit string that approximates m* (e.g., the optimal max-cut solution for the graph 104). In other words, the max-cut approximate solution 702 can be considered as a string of bits whose length is equal to and/or otherwise based on the cardinality of the set of vertices 106, where each bit in the max-cut approximate solution 702 indicates which of two subsets a respectively corresponding vertex in the set of vertices 106 belongs. In various aspects, the rounding component 122 can compute and/or calculate the max-cut approximate solution 702, by applying magic state rounding and/or Pauli rounding to the relaxed quantum state 602. This is explained in more detail below.

The state $\rho_{relax}$ can be not, in general, in the image of F. For almost all graphs, the energy of $\rho_{relax}$ can be strictly greater than the energy of the embedding of the optimal configuration of binary variables, F(m*). Accordingly, there can be a need for a procedure that produces a candidate configuration m when given $\rho_{relax}$. In various aspects, this can be accomplished with either magic state rounding or Pauli rounding.

First, consider magic state rounding. Consider the single-qubit magic states given by the following Equation 8:

$$\mu^{\pm} = \frac{1}{2}\left(I \pm \frac{1}{\sqrt{3}}(X+Y+Z)\right)$$

and set $\mu_1^{\pm}=X\mu^{\pm}X$, $\mu_2^{\pm}=Y\mu^{\pm}Y$, $\mu_3^{\pm}=Z\mu^{\pm}Z$, and $\mu_4^{\pm}=\mu^{\pm}$. Measuring in the bases associated with $\mu_i^{\pm}$ for $i \in [4]$ can correspond to estimating the expectation value of $\mu_i^+ - \mu_i^-$. In various cases, magic state rounding can be defined as the procedure $\mathcal{M}$ that takes a single-qubit density $\rho$ and uniformly at random selects a measurement basis $\{\mu_i^+, \mu_i^-\}_{i \in [4]}$ in which to measure a quantum state $\rho$. This provides a state $\mathcal{M}(\rho)$ that, in expectation, is given by the following Equation 9:

$$\mathbb{E}(\mathcal{M}(\rho)) = \mathbb{E}_{i \in [4]} \mathbb{E}_{s \in \{\pm\}}(\mathcal{M}(\rho))$$

$$= \frac{1}{4} \sum_{i \in [4]} \sum_{s \in \{\pm\}} Tr(\mu_i^s \rho)\mu_i^s$$

$$= \varepsilon_{1/3}(\rho)$$

where $!_\delta$ represents the single-qubit depolarizing channel: $\varepsilon_\delta(I)=I$ and $\varepsilon_\delta(P)=\delta P$ for $P \in \{X,Y,Z\}$. On a quantum processor (e.g., the quantum computer 604 and/or the quantum simulator 606), which can natively perform measurement in the Z-basis, measuring in magic bases can require only single-qubit unitaries. A detailed description of those basis change unitaries is provided in the Supplementary Information near the end of this disclosure. In various aspects, the rounding component 122 can apply $\mathcal{M}$ to all qubits independently, and this quantum channel can be denoted as $\mathcal{M}^{\otimes n}$. Upon application of $\mathcal{M}^{\otimes n}$, the state of each qubit can be one of $\mu_i^{\pm}$, hence the three binary variables associated with each qubit can become fixed via the Equation 4, meaning that the associated classical decision variables (e.g., the bits that make up the max-cut approximate solution 702) can be given via the Equation 4. Accordingly, this can be considered as a map given by the following Equation 10:

$$\mathcal{M}^{\otimes n}: \rho_{relax} \mapsto F(m)$$

for some bit string m. This procedure can be referred to as magic state rounding.

Using the result in the Equation 9, a relaxation bound for the average cut obtained with the map $\mathcal{M}^{\otimes n}$ can be computed as follows. First, let $\gamma$ denote the approximation ratio for a fixed configuration m (relative to any optimal configuration m*). This can yield the following Equation 11:

$$\gamma = \frac{cut(m)}{cut(m^*)} = \frac{Tr(H \cdot F(m))}{Tr(H \cdot F(m^*))}$$

Accordingly, it can be shown that, when given access to $\rho_{relax}$ which can be a quantum state with energy between m* and the maximal eigenstate of H, magic state rounding produces a configuration m whose expected approximation ratio is at least 5/9. In other words, the following Equation 12 holds true:

$$\mathbb{E}(\gamma) = \frac{\mathbb{E}(Tr(H \cdot \mathcal{M}^{\otimes n}(\rho_{relax})))}{Tr(H \cdot F(m^*))} \geq \frac{5}{9}$$

This is proved in the Supplementary Information near the end of this disclosure.

Furthermore, suppose $\rho_1, \rho_2$ are any states satisfying $\text{Tr}(H\rho_1) \geq \text{Tr}(H\rho_2) \geq |E|/2$. Then the proof in the Supplementary Information near the end of this disclosure also indicates that the rounded solutions respect the inequality in expectation: $\mathbb{E}(\text{Tr}(H \cdot \mathcal{M}^{\otimes n}(\rho_1))) \geq \mathbb{E}(\text{Tr}(H \cdot \mathcal{M}^{\otimes n}(\rho_2)))$. In other words, the higher the energy of the quantum state to which magic state rounding is applied, the better. In general, the rounded average expected value is linearly proportional to $\text{Tr}[H\rho]$; which benefits encodings whose relaxed spectrum is maximally separated from the optimal cut m*. Furthermore, as shown in the Supplementary Information near the end of this disclosure, note that using a (2,1,p) QRAC encoding yields an expected approximation ratio $\mathbb{E}(\gamma)$ of $5/8 = 0.625$.

Now, consider Pauli rounding. In various aspects, Pauli rounding can involve the direct estimation of the Pauli operators $P_{c,i}$ associated to each vertex $v_{c,i}$ and the selection of binary graph variables according to $m_{c,i} = \text{sign}(\text{Tr}(P_{c,i} \cdot \rho))$. If $\text{Tr}(P_{c,i} \cdot \rho)$ is exactly zero, a binary variable can be assigned uniformly at random.

An aspect to consider can be the measurement cost of estimating $\text{Tr}(H\rho)$ if a candidate ground state is obtained with variational algorithms. A dependence logarithmic in the system size |E| of the error $\epsilon$ for an estimate of the approximation ratio $\gamma$ in the Equation 11 can be shown, which can be called a multiplicative error. Classical shadows via random Pauli measurements can be used, whose variance can be bounded as follows: The classical shadows estimator for $\text{Tr}(H\rho)$ can achieve an estimate with at most E multiplicative error with success-rate $1-\delta$ provided the number of measurements S satisfies $$S > \frac{2 \cdot 3^4}{\varepsilon^2} \log(2|E|/\delta).$$

This is proved in the Supplementary Information near the end of this disclosure. Furthermore, numerical evidence suggests that the number of measurements required can be significantly reduced if optimized randomized estimators are used. For completeness, the Supplementary Information near the end of this disclosure proves that if a state $\rho$ is known to be in the image of F, then the estimation of $\text{Tr}(H\rho)$, with success rate $1-\delta$, requires a number of measurements S satisfying $S > 2 \cdot 3^4 \cdot \log(2|E|/\delta)$.

In any case, the rounding component 122 can compute the max-cut approximate solution 702 by applying magic state rounding and/or Pauli rounding to the relaxed quantum state 602.

In various embodiments, the execution component 124 can electronically perform, facilitate, and/or otherwise initiate any suitable computerized action based on the max-cut approximate solution 702. For example, in some cases, the execution component 124 can electronically transmit the max-cut approximate solution to any suitable computing device (not shown). As another example, the execution component 124 can electronically render the max-cut approximate solution on any suitable display screen/monitor (not shown).

FIGS. 8-10 illustrate example, non-limiting algorithms that can be implemented in various embodiments described herein. More specifically, FIG. 8 illustrates a non-limiting example algorithm that can facilitate computation of a max-cut approximate solution via quantum relaxation and rounding, FIG. 9 illustrates a non-limiting example algorithm that can facilitate magic state rounding, and FIG. 10 illustrates a non-limiting example algorithm that can facilitate Pauli rounding. In any case, the max-cut quantum relaxation system 102 can facilitate any of the algorithms depicted in FIGS. 8-10. Moreover, FIGS. 8-10 illustrate non-limiting embodiments of the invention as applied to (3,1,p) QRAC. However, the algorithms shown in FIGS. 8-10 can be readily extended to any other suitable embeddings, as those having ordinary skill in the art will appreciate.

Figure 11:
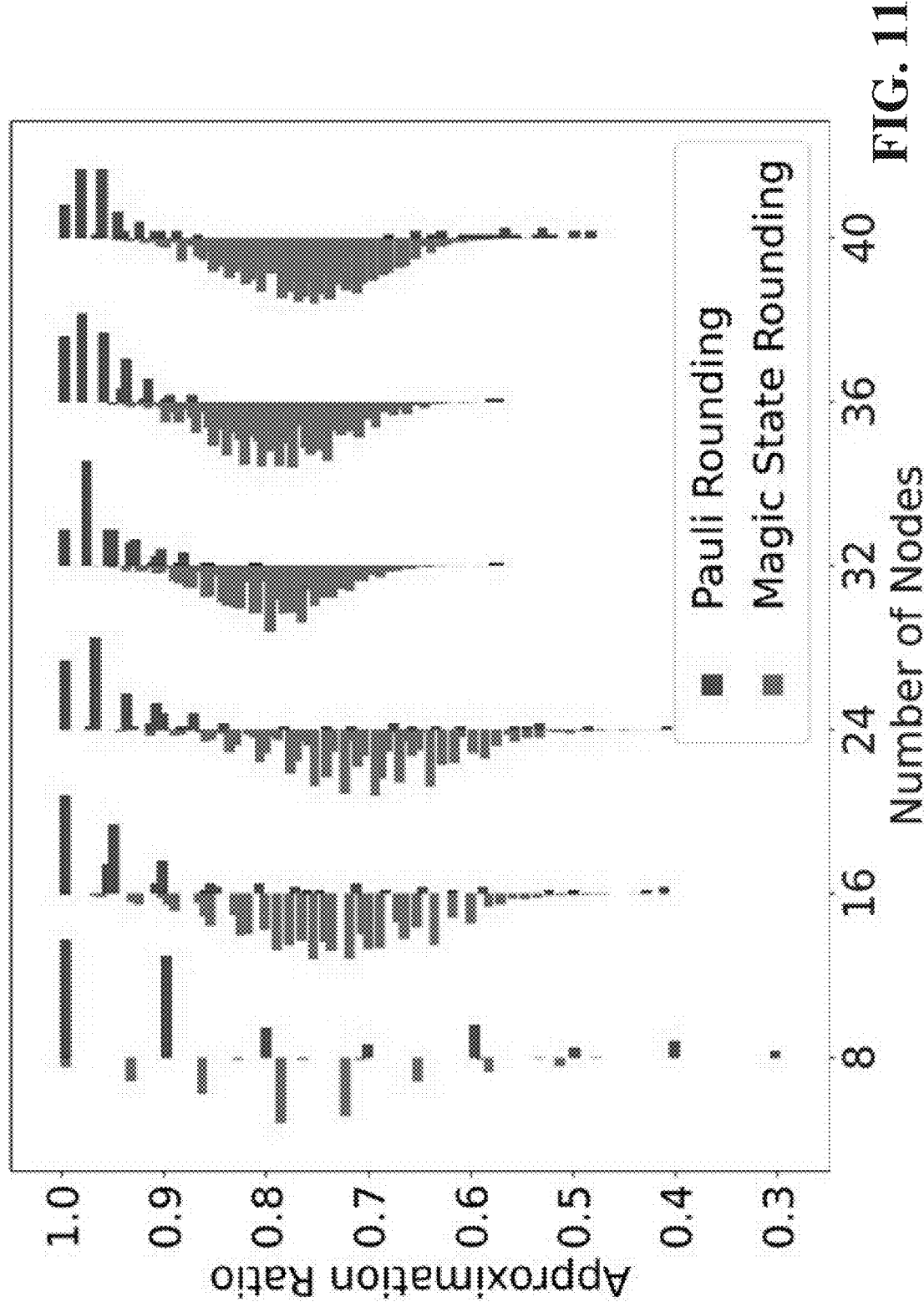
FIGS. 11-13 illustrate example, non-limiting experimental results that demonstrate benefits of various embodiments described herein.
Figure 12:
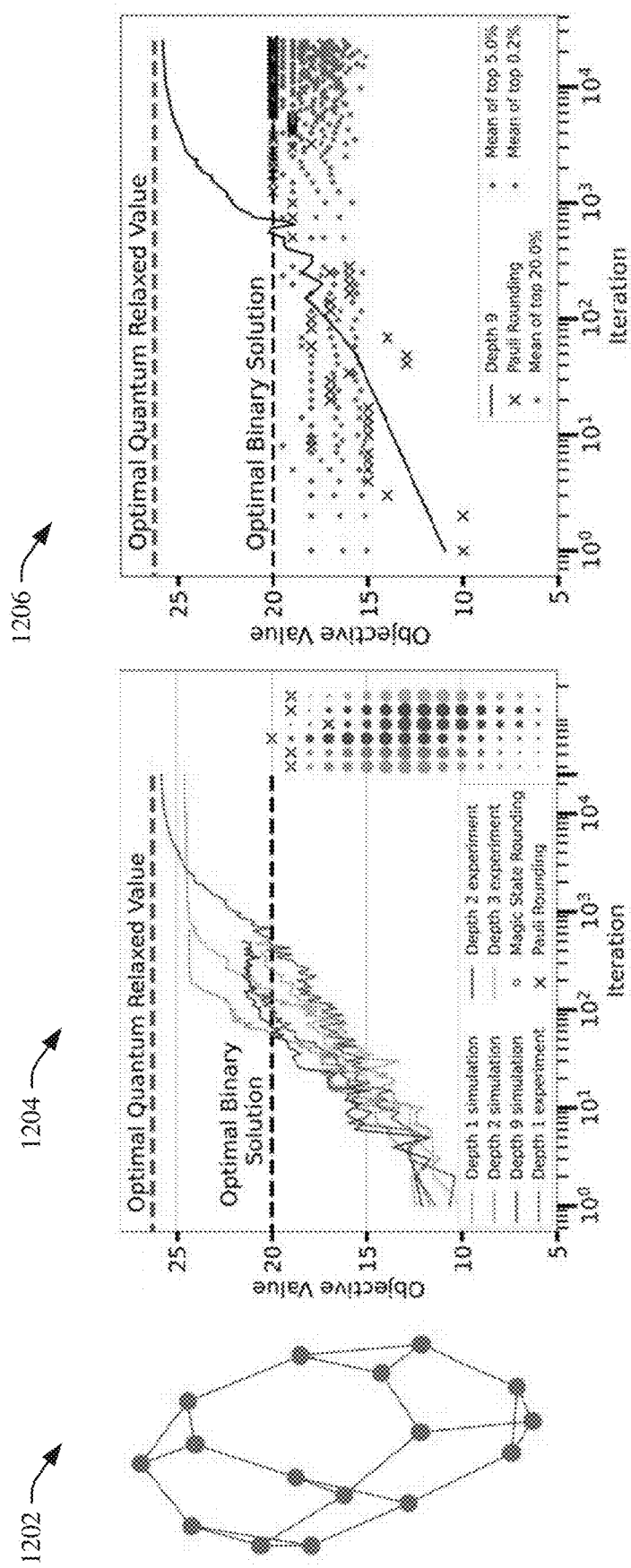
Figure 13:
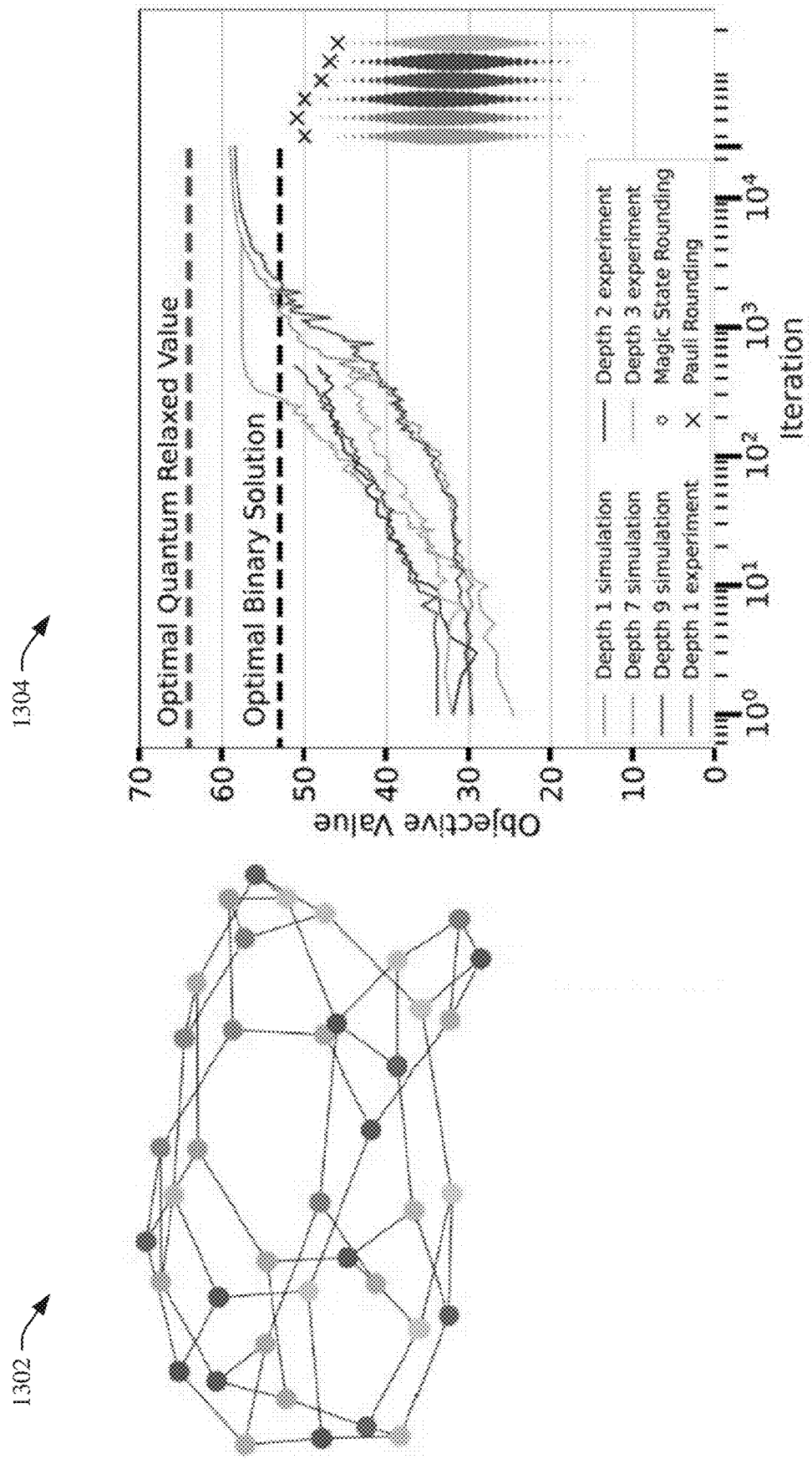

FIGS. 11-13 illustrate example, non-limiting experimental results that demonstrate benefits of various embodiments described herein.

First, consider FIG. 11. In order to test the performance of the two quantum rounding methods presented herein (e.g., magic state rounding and Pauli rounding), numerical simulations were first performed on 100 random max-cut instances on 3-regular graphs of increasing size, with n=8, 16, 24, 32, 36, 40. Next, relaxed Hamiltonians using (3,1,p) QRAC embeddings for each max-cut graph were computed. On average, these relaxed Hamiltonians have a number of qubits reduced by a factor 2.6 with respect to the number of nodes in the original 3-regular graphs. Their ground states were numerically computed via exact diagonalization and magic state rounding was performed 100 times, separately for each graph. For every call to magic state rounding, the corresponding approximation ratio $\gamma$ as in the Equation 11 was computed, using IBM ILOG CPLEX to obtain the optimal cuts m*. The computed approximation ratios are shown in the histogram 1100. As can be seen, on average cuts were obtained greater than $5/8$. Next, Pauli rounding was benchmarked on the same problems, computing exactly for each ground state $\text{Tr}(P_{c,i}\rho)$ for every vertex. As shown in the histogram 1100, Pauli rounding obtained better approximation ratios as compared to magic state rounding.

Next, consider FIG. 12. The robustness of various embodiments described herein was probed when implemented in conjunction with a variational eigensolver, where the variational eigensolver was used to find a candidate ground state $\rho_{relax}$. Two 3-regular graphs from the random ensemble generated for FIG. 11 were picked (e.g., one graph of 16 nodes and another of 40 nodes), with exact approximation ratio $\gamma=1$ according to Pauli rounding.

First consider the 16-node graph, as represented by numeral 1202. The ground state of its relaxed Hamiltonian was searched for both numerically and on an ibmq_dublin quantum processor. In both cases, a hardware-efficient ansatz with different depths was used. The numerical experiments were conducted using the COBYLA optimizer for up to 25000 iterations, while the experiments on the superconducting processor were performed with an adaptive SPSA optimizer, using 500 iterations and 8192 measurements for each independent basis to estimate the relaxed Hamiltonian. For further details about the experiments, see the Supplementary Information near the end of this disclosure.

As shown by numeral 1204, the simulations demonstrated that the trial states reach relaxed values of the objective function (e.g., the Hamiltonian "energy") which are inaccessible to the combinatorial cost function. Once the state is optimized, magic state rounding was performed 1000 times to obtain admissible cut distributions, which are represented by the colored markers on the bottom right in the numeral 1204. Pauli rounding was then applied to the optimized states for the different depths, obtaining cut values indicated by the "X" markers. The state prepared with a trial circuit of depth 9 obtained an approximation ratio of 1, even if its optimized objective value did not match exactly the optimal relaxed value, hinting at a robustness from the relaxed formulation of the problem. A variational optimization on the ibmq_dublin quantum processor was then performed, observing even on noisy hardware that relaxed optimized energies go above the optimal combinatorial solution.

Numerical simulations to show the robustness of the rounding schemes on this 16-node graph against an incomplete optimization search are shown by the numeral 1206. The quantum state was rounded as it went through the variational optimization, observing that good convergence is achieved for both rounding schemes already around ~1000 iterations, without requiring an accurate ground state preparation, which happened at the end of the 25000 optimization steps.

Now, consider FIG. 13. The proposed techniques were then tested on the 40-node graph represented by the numeral 1302. Its 40 vertices were mapped into 15 qubits of the ibmq_dublin quantum processor. The performance of the herein described teachings with respect to the 40-node graph is shown by the numeral 1304 for a hardware-efficient ansatz of various depths. The quantum state was optimized by maximizing mean values for a relaxed Hamiltonian computed on the 15 qubits, then rounded using both magic state and Pauli rounding. Approximation ratios of $\gamma=51/53\approx0.9623$ and $\gamma=0.905$ were obtained for theory and hardware runs, respectively.

Additionally, a weighted max-cut problem $\max_{m\in\{-1,1\}^{|V|}} \Sigma e_{i,j} \in E \frac{1}{2} w_{ij}(1-m_i m_j)$ with edge weights $w_{ij}>0$ on a planar graph on 40 nodes was considered, arising in the context of industrial aerospace design. Although not explicitly shown herein, those having ordinary skill in the art will appreciate that the herein teachings can be readily extended to weighted max-cut (e.g., the herein techniques are not limited only to unweighted max-cut). The best solution obtained in experiments, with Pauli rounding, showed that most high-weight constraints were satisfied. An approximate solution of 617 was obtained, where the optimal objective value was 641.

The theoretical and experimental results presented in FIGS. 11-13 show that it is possible to produce approximate solutions of max-cut and weighted max-cut by preparing on quantum computers approximate high energy states of quantum Hamiltonians, which are relaxations of the original combinatorial problems. The largest experiments conducted by the present inventors on a superconducting quantum processor have shown approximation ratios for 40-node graphs of 0.905 on unweighted 3-regular max-cut and 617/641≈0.9626 on weighted planar max-cut. Through a randomized quantum rounding procedure, various embodiments described herein have established rigorous connections between the energy of a relaxed quantum state and the average value of its rounded max-cut approximation. The present inventors have proved that rounding from higher relaxed energy states leads to better combinatorial solutions. Approximation algorithms for many-body quantum states could be employed to prepare ground state approximations for the relaxed problems. Through numerical and experimental investigation, it has been shown that the deterministic Pauli rounding outperformed the magic state rounding. In various aspects, other rounding protocols for relaxed states can be investigated, which for example could take into account non-local correlations.

Figure 14:
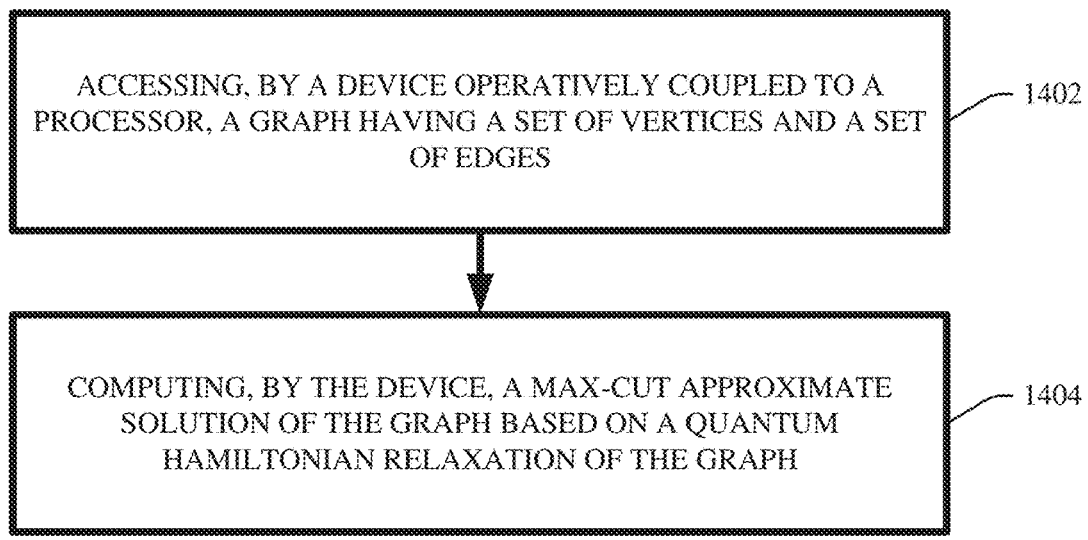
FIG. 14 illustrates a flow diagram of an example, non-limiting computer-implemented method that facilitates max-cut approximate solution via quantum relaxation in accordance with one or more embodiments described herein.

FIG. 14 illustrates a flow diagram of an example, non-limiting computer-implemented method 1400 that can facilitate max-cut approximate solution via quantum relaxation in accordance with one or more embodiments described herein. In various cases, the max-cut quantum relaxation system 102 can facilitate the computer-implemented method 1400.

In various embodiments, act 1402 can include accessing, by a device (e.g., via 114) operatively coupled to a processor, a graph (e.g., 104) having a set of vertices (e.g., 106) and a set of edges (e.g., 108).

In various aspects, act 1404 can include computing, by the device (e.g., via 122), a max-cut approximate solution (e.g., 702) of the graph based on a quantum Hamiltonian relaxation (e.g., 502) of the graph.

Although not explicitly shown in FIG. 14, the computer-implemented method 1400 can further comprise: computing, by the device (e.g., via 116), a coloring (e.g., 202) of the graph, such that any two vertices of the graph that are linked together by an edge have different colors; and assigning, by the device (e.g., via 116), weight-1 Pauli operators (e.g., 204) to the set of vertices based on the coloring.

Although not explicitly shown in FIG. 14, the computer-implemented method 1400 can further comprise: generating, by the device (e.g., via 118), the quantum Hamiltonian relaxation based on the weight-1 Pauli operators.

Although not explicitly shown in FIG. 14, the computer-implemented method 1400 can further comprise: identifying, by the device (e.g., via 120) and via execution of a quantum computer (e.g., 604) or a quantum simulator (e.g., 606), a relaxed quantum state (e.g., 602) of the quantum Hamiltonian relaxation.

Although not explicitly shown in FIG. 14, the computer-implemented method 1400 can further comprise: computing, by the device (e.g., via 122), the max-cut approximate solution by applying magic state rounding or Pauli rounding to the relaxed quantum state.

This marks the beginning of the Supplementary Information that is provided in this disclosure. The following Supplementary Information includes various mathematical proofs and/or lemmas provided by the present inventors to help clarify various details of the invention.

Relaxation Bound

First, consider how to prove a relaxation bound with respect to magic state rounding. In various cases, a relaxation bound on the energy obtained by rounding quantum states with magic state rounding can be obtained. Let $\rho_{relax}$ be a maximum-energy eigenstate of the Hamiltonian H and recall that F(m*) is a maximum-energy state within the image of F. The present inventors have provided a probabilistic algorithm which takes $\rho_{relax}$ and provides a state $F(m)=\mathcal{M}^{\otimes n}(\rho_{relax})$ such that, in expectation, $\mathbb{E}(\mathrm{Tr}(H\cdot F(m)))\geq \frac{5}{9}\mathrm{Tr}(H\cdot F(m^*))$. This can be considered as an application of Lieb's theorem. Consider the magic states $$\mu^{\pm} = \frac{1}{2}\left(I \pm \frac{1}{\sqrt{3}}(X+Y+Z)\right)$$

on a single qubit and set the following Equation 13:

$$\mu_1^{\pm}=X\mu^{\pm}X,\ \mu_2^{\pm}=Y\mu^{\pm}Y,\ \mu_3^{\pm}=Z\mu^{\pm}Z,\ \mu_4^{\pm}=\mu^{\pm}$$

Measuring in the bases associated with $\mu_i^{\pm}$ for $i\in[4]$ corresponds to estimating the expectation value of $\mu_i^+-\mu_i^-$ respectively. Let $\mathcal{M}$ be the procedure that takes a single-qubit density $\rho$ and uniformly at random selects a measurement basis $\{\mu_i^+,\mu_i^-\}_{i\in[4]}$ in which to measure $\rho$. This provides a state $\mathcal{M}(\rho)$. In expectation, the following Equation 14 holds true:

$$\mathbb{E}(\mathcal{M}(\rho)) = \mathbb{E}_{i\in[4]}\mathbb{E}_{s\in\{\pm\}}(\mathcal{M}(\rho)) = \frac{1}{4}\sum_{i\in[4]}\sum_{s\in\{\pm\}} Tr(\mu_i^s\rho)\mu_i^s = \varepsilon_{\frac{1}{3}}(\rho)$$

where $\varepsilon_\delta$ is the single-qubit depolarizing channel: $\varepsilon_\delta(I)=I$ and $\varepsilon_\delta(P)=\delta P$ for $P \in \{X,Y,Z\}$. This channel, when applied to a quantum state supported on multiple qubits, is entanglement breaking for $\delta \leq 1/3$.

The previous paragraph can be extended to the multi-qubit setting by considering the map $\mathcal{M}^{\otimes n}$ so that for traceless single-qubit Pauli operators P,Q supported on different qubits, and an n-qubit density $\rho$, the following Equation 15 can be obtained:

$$\mathbb{E}(Tr(PQ \cdot \mathcal{M}^{\otimes n}(\rho))) = Tr\left(PQ \cdot \varepsilon_{\frac{1}{3}}^{\otimes n}(\rho)\right) = Tr\left(\varepsilon_{\frac{1}{3}}^{\otimes n}(PQ) \cdot \rho\right) = \frac{1}{9} Tr(PQ \cdot \rho)$$

The second equality follows from self-adjointness of $\varepsilon_\delta^{\otimes n}$ with respect to the inner-product $\langle A,B \rangle = Tr(A \cdot B)$.

The procedure of applying $\mathcal{M}^{\otimes n}$ produces a state which is in the image of F. Therefore, starting with $\rho_{relax}$, the maximum energy eigenstate of H, some (random-variable) encoded state $F(m) = \mathcal{M}^{\otimes n}(\rho_{relax})$ can be recovered. Note that $$H - \frac{|E|}{2} I$$

is a Hamiltonian of weight-2 Pauli operators and therefore, by linearity of the Equation 15, the following Equation 16 can be obtained:

$$\mathbb{E}\left(Tr\left(\left(H - \frac{|E|}{2}I\right) \cdot \mathcal{M}^{\otimes n}(\rho_{relax})\right)\right) =$$
$$\frac{1}{9} Tr\left(\left(H - \frac{|E|}{2}I\right) \cdot \rho_{relax}\right) \geq \frac{1}{9} Tr\left(\left(H - \frac{|E|}{2}I\right) \cdot F(m^*)\right)$$

The final term is bounded, that is, $$Tr\left(\left(H - \frac{|E|}{2}I\right) \cdot F(m^*)\right)$$

taxes values in the interval $$\left[0, \frac{|E|}{2}\right].$$

Shifting the energy back to include the identity term recovers a lower bound for the approximation ratio. Specifically, let $\gamma$ denote the approximation ratio for a configuration m (relative to any optimal configuration $m^*$), that is $\gamma = cut(m)/cut(m^*)$. Then, in expectation, this procedure leads to the following bound for the approximation ratio:

$$\mathbb{E}(\gamma) = \frac{\mathbb{E}(Tr(H \cdot \mathcal{M}^{\otimes n}(\rho_{relax})))}{Tr(H \cdot F(m^*))} =$$

$$\frac{1}{Tr(H \cdot F(m^*))}\left(\frac{|E|}{2} + \mathbb{E}\left(Tr\left(\left(H - \frac{|E|}{2}I\right) \cdot \mathcal{M}^{\otimes n}(\rho_{relax})\right)\right)\right) \geq$$

$$\frac{1}{Tr(H \cdot F(m^*))}\left(\frac{|E|}{2} + \frac{1}{9}Tr\left(\left(H - \frac{|E|}{2}I\right) \cdot F(m^*)\right)\right) =$$

$$\frac{\frac{|E|}{2} + \frac{1}{9}Tr\left(\left(H - \frac{|E|}{2}I\right) \cdot F(m^*)\right)}{\frac{|E|}{2} + Tr\left(\left(H - \frac{|E|}{2}I\right) \cdot F(m^*)\right)} \geq \min_{\alpha \in \left[0, \frac{|E|}{2}\right]} \left(\frac{\frac{|E|}{2} + \frac{1}{9}\alpha}{\frac{|E|}{2} + \alpha}\right) = \frac{5}{9}$$

Thus, the present inventors have proved that the relaxation procedure, followed by rounding using magic-bases measurements, provides a candidate encoded state which, in expectation, has an approximation ratio of at least 5/9.

Two remarks are in order. First, the lower bound obtained for the approximation ratio holds true for states close to $\rho_{relax}$. Specifically, the first inequality in the calculation of $\mathbb{E}(\gamma)$ is the same inequality as the one obtained in the Equation 16. This inequality is true for any state $\rho$ whenever $Tr(H\rho) \geq Tr(H \cdot F(m^*))$. Therefore an expectation ratio of at least 5/9 is obtained whenever there is access to a state $\rho$ satisfying $Tr(H\rho) \geq Tr(H \cdot F(m^*))$.

Second, consider two states $\rho_1, \rho_2$ which satisfy $Tr(H\rho_1) \geq Tr(H\rho_2) \geq |E|/2$. Then the equality in the Equation 16 becomes the following Equation 17:

$$\mathbb{E}\left(Tr\left(\left(H - \frac{|E|}{2}I\right) \cdot \mathcal{M}^{\otimes n}(\rho_i)\right)\right) = \frac{1}{9}Tr\left(\left(H - \frac{|E|}{2}I\right) \cdot \rho_i\right)$$

for $i \in \{1,2\}$ and the energies in the preceding display are both positive since $Tr(H\rho_i) \geq |E|/2$ is a constraint. Adding back the identity term and using the inequality relating the energies of $\rho_1$ and $\rho_2$ implies the following Equation 18:

$$\mathbb{E}(Tr(H \cdot \mathcal{M}^{\otimes n}(\rho_1))) \geq \mathbb{E}(Tr(H \cdot \mathcal{M}^{\otimes n}(\rho_2)))$$

This chain of reasoning can also be turned into a statement about the respective approximation ratios obtained from $\rho_1$ and $\rho_2$.

Relaxation Bound for Graphs with Small Max-Cut Value

In various aspects, a formula for the approximation ratio in the regime where the max-cut value is small can be obtained. In this regime, any bound of the form as that primarily described above can become trivial. This is because for small max-cut, such a bound will be worse than $|E|/2$, which is the value obtained, in expectation, by random assignment of the values of the binary variables.

Consider a graph G=(V,E). Introduce the parameter $0 < \varepsilon^* \leq 1/2$ such that the following Equation 19 holds true:

$$cut(m^*) = (1/2 + \varepsilon^*)|E|$$

The variable $\varepsilon^*$ is called the gain, and the problem of evaluating $\varepsilon^*$ is called max-cut gain. Consider the regime $\varepsilon^* \ll 1/2$. Existing techniques give an efficient approximate classical algorithm for this problem whose approximation for the gain scales $\Omega(\varepsilon^*/\log(1/\varepsilon^*))$. Assuming the Unique Games Conjecture, this is optimal. Other existing techniques show a spectral partitioning algorithm for max-cut whose approximation ratio is 0.531 which can also be used in this regime in addition to the regime $\varepsilon^* \approx 1/2$. There are only a few such algorithms that have non-trivial guarantees of max-cut approximation ratio.

Set $\varepsilon_{relax} > 0$ through the equation $Tr(H \cdot \rho_{relax}) = (1/2 + \varepsilon_{relax})|E|$. An application of the triangle inequality establishes the upper bound $\varepsilon_{relax} \leq 3/2$. The herein described quantum rounding procedure implies the following Equation 20:

$$\mathbb{E}(Tr(H \cdot \mathcal{M}^{\otimes n}(\rho_{relax}))) = (1/2 + 1/9 \varepsilon_{relax})|E|$$

The Equation 19 and the Equation 20 are effectively giving Lieb's theorem: $1/9 \varepsilon_{relax} \leq \varepsilon^*$. However in this context, the conclusion is that the herein described algorithm, under the assumption of access to $\rho_{relax}$, provides a candidate value for max-cut gain which scales linearly without the logarithmic cost $1/\log(1/\epsilon^*)$. Of course, the Unique Games Conjecture does not hold when one considers quantum computational models. Furthermore, note that in the context of max-cut gain it could be advantageous even to perform quantum rounding upon classical approximations of $\rho_{relax}$, which can deliver energies of at least $|E|(\frac{1}{2}+\frac{1}{48}d)$ for d-regular graphs.

Measurement in Magic Bases on a Quantum Processor

It can be desired to measure a single-qubit density $\rho \in \mathcal{D}(\mathbb{C}^2)$ in one of the four magic bases defined in the Equation 13. The following explains how to perform such a measurement when a quantum processor which only allows measurement in the Z-basis is given.

Let $\pi_Z^\pm$ denote the projections onto the $\pm 1$-eigenspaces of the Pauli operator Z. These projections are written in the familiar bracket formalism, as $\pi_Z^+=|0\rangle\langle 0|$ and $\pi_Z^-=|1\rangle\langle 1|$. Consider a pure state $\psi=\frac{1}{2}(I+aX+bY+cZ)$ with $a^2+b^2+c^2=1$. This state can be obtained from the initial state $\pi_Z^+$ by observing $\psi=e^{isZ}e^{itX}\pi_Z^+e^{-itX}e^{-sZ}$ with $\cos^2 t=\frac{1}{2}(1+c)$ and $\sin(2s)=a/\sqrt{a^2+b^2}$. Therefore, in order to rotate between the state $\pi_Z^+$ and the magic state $\mu_4^+$, rotations must be performed such that the following Equation 21 holds:

$$\cos^2(t) = \frac{1}{2}\left(1+\frac{1}{\sqrt{3}}\right), \quad \sin(2s) = \frac{1}{\sqrt{2}}$$

Now consider how to measure a density $\rho$ in any of the four magic bases: First, consider the simplest magic basis $\{\mu_4^+, \mu_4^-\}$. Perform the necessary rotations so that $\mu_4^+$ is rotated into the state $\pi_Z^+$. That is, perform $e^{-isZ}$ then perform $e^{-itX}$ where s,t are given in the Equation 21. This rotates $\mu_4^-$ into $\pi_Z^-$. Then, measure the state in the Z-basis which returns either $\pi_Z^+$ or $\pi_Z^-$. This can be the end of the procedure since the herein described teachings can refrain from using the quantum processor past this point. Second, consider a general magic basis $\{\mu_i^+,\mu_i^-\}$ where $i \in [4]$. Set $P_i=X,Y,Z,I$ given respectively $i=1,2,3,4$. Apply $P_i$, and then apply the procedure outlined in the preceding few sentences.

Recovery of Hamiltonian Expectation Provided Arbitrary State

Consider the task of estimating $\text{Tr}(H\rho)$ for a Hamiltonian associated with a graph $G=(V,E)$. Assume, for the moment, $\rho$ is an arbitrary state on the n-qubit quantum processor. In order to obtain a bound on the complexity of this problem, classical shadows with random Pauli measurements can be used, as described below. This technique can be referred to as classical shadows. In practice, the technique of locally-biased classical shadows can be significantly more efficient.

Let S be the number of state preparations of $\rho$, and let $v^{(s)}$ for $s \in [S]$ be a random variable obtained from the classical shadows measurement procedure which, in an unbiased fashion, estimates $\text{Tr}(H\rho)$. That is, $\mathbb{E}(v^{(s)})=\text{Tr}(H\rho)$. Set $$v = \frac{1}{s}\sum_{k \in [S]} v^{(s)}.$$

In a similar fashion, let $\mu_e^{(s)}$ be a random variable associated with estimating $\text{Tr}(O_e\rho)$ for $e \in E$ using classical shadows, and set $$\mu_e = \frac{1}{s}\sum_{k \in [S]} \mu_e^{(s)}.$$

Consider the scaling of S with respect to the size of the graph G such that: (1) v estimates $\text{Tr}(H\rho)$ to additive error $\epsilon$; and (2) v estimates $\text{Tr}(H\rho)$ to additive error $\epsilon|\text{Tr}(H \cdot F(m^*))|$.

The second scaling (e.g., point (2) above) should be understood in the context of the VQE algorithm when $\rho$ is close to $\rho_{relax}$, since the approximation ratio is being used as a success metric. The typical context in which VQE algorithms are used is quantum chemistry. There, one is typically interested in reaching chemical accuracy on the ground state, which is independent of system size. Here, the concern is instead recovering an approximate solution with a large approximation ratio, defined relative to a configuration m* maximising the Equation 1. Point (2) above is therefore estimating $\text{Tr}(H\rho)$ to multiplicative error $\epsilon$. And it is this multiplicative-error regime which should scale favorably in the limit of large graphs. Both of these scalings require the following few lemmas.

LEMMA 1: Let $\kappa, \delta > 0$. Then the expectation observables $O_e$ can be estimated using classical shadows such that, for all $e \in E$, the following Equation 22 holds true:

$$\mathbb{P}(|\text{Tr}(O_e\rho)-\mu_e|<\kappa) > 1-\delta$$

Such estimating can be accomplished if $$S > \frac{2 \cdot 3^2}{\kappa^2}\log(2|E|/\delta).$$

The proof of Lemma 2 is as follows. The variance of $\mu_e$ can be known. However it suffices to note that $O_e$ is a weight-2 Pauli operator, and the random variable $\mu_e^{(s)}$ is a random variable bounded by the value $3^2$. Hoeffding's inequality then implies that for a fixed edge e, the following Equation 23 holds true:

$$\mathbb{P}(|\text{Tr}(O_e\rho)-\mu_e| > \kappa) < 2\exp\left(\frac{-S\kappa^2}{2 \cdot 3^2}\right)$$

The result follows upon applying a union bound in order to ensure all edges are accurately measured.

LEMMA 2: Let $\epsilon, \delta > 0$. Then the classical shadows estimator v for $\text{Tr}(H\rho)$ achieves the following Equation 24:

$$\mathbb{P}\left(\left|\frac{\text{Tr}(H\rho)-v}{\text{Tr}(H \cdot F(m^*))}\right| < \epsilon\right) > 1-\delta$$

provided that $$S > \frac{2 \cdot 3^4}{\epsilon^2}\log(2|E|/\delta).$$

The proof of Lemma 2 is as follows. Lemma 1 and the requirement on S imply that the estimators $\mu_e$ for $\text{Tr}(O_e\rho)$ satisfy, for all $e \in E$, the following Equation 25:

$$\mathbb{P}\left(|\text{Tr}(O_e\rho)-\mu_e| < \frac{\epsilon}{3}\right) > 1-\delta$$

Therefore, with probability greater than $1-\delta$, the following Equation 26 holds true:

$$\frac{3}{|E|}\sum_{e\in E}|Tr(O_e\rho)-\mu_e|<\varepsilon$$

Leaving this argument for the moment, consider $Tr(H\cdot F(m^*))$. The inequality $Tr(H\cdot F(m^*))=cut(m^*)>|E|/2$ holds, which is a classic result obtained by considering the max-cut algorithm which randomly assigns the values of the binary variables associated with the vertices. Therefore, the following Equation 27 can be obtained:

$$\frac{1}{Tr(H\cdot F(m^*))}\leq\frac{2}{|E|}$$

The triangle inequality applied to the Hamiltonian in the Equation 5 gives $|Tr(H\rho)-v|\leq 3/2\Sigma_{e\in E}|Tr(O_e\rho)-\mu_e|$ which, combined with the Equation 27, provides the following Equation 28:

$$\left|\frac{Tr(H\rho)-v}{Tr(H\rho_{relax})}\right|\leq\frac{3}{|E|}\sum_{e\in E}|Tr(O_e\rho)-\mu_e|$$

Combining this inequality with the Equation 26 (which holds with probability greater than $1-\delta$) establishes the Lemma 2. Note that the proof provides a result stronger than the announced lemma. Specifically, consider the bound in the Equation 27. This bound is true, in expectation, for $Tr(H\cdot F(m))$ provided m is chosen uniformly at random. The multiplicative error, and hence number of measurements required, can therefore be understood for all stages of a VQE routine provided that the routine begins in a randomly-chosen encoded state $F(m)$ whence subsequent intermediate states $\rho$ ought to have energy also above $|E|/2$.

LEMMA 3: Let $\varepsilon,\delta>0$. Then, with probability $1-\delta$, an $\varepsilon$-accurate (in the additive sense) estimation of $Tr(H\rho)$ can be obtained using the classical shadows estimator v provided that $$S>\frac{3^4}{2\varepsilon^2}|E|^2\log(2|E|/\delta).$$

The proof of Lemma 3 is very similar to the proof of the Lemma 2, with a slight adjustment. Specifically, the increased number of measurements implies that the accuracy of each estimator in the Equation 25 becomes $2\varepsilon/3|E|$. The triangle inequality, applied to $|Tr(H\rho)-v|$, then provides additive-error accuracy of $\varepsilon$.

Recovery of Cut Value Given Embedded State

Now, consider recovery of a cut value when given an embedded state. Suppose there is a state $\rho$ which is guaranteed to be an encoded state for some m. That is, $\rho=F(m)$; however, there can be no direct access to m. The goal can be to understand how many copies of $\rho$ are required in order to accurately estimate $cut(m)$. As explained above, there can be estimators $\mu_e$ using the classical shadows estimation routine such that $\mathbb{E}(\mu_e)=Tr(O_e\rho)$ for all weight-2 Pauli operators $O_e$ present in the Hamiltonian H. Hoeffding's inequality shows the probability that $Tr(O_e\rho)$ and $\mu_e$ differ by $\kappa$ additive error, given the Equation 23. Since it is assumed that $\rho=F(m)$ for some unknown configuration m, it is guaranteed that $$Tr(O_e\rho)=\pm\frac{1}{\sqrt{3}\sqrt{3}},$$

hence there can be a need to estimate $Tr(O_e\rho)$ to within $\kappa=\frac{1}{3}$ additive error. This accuracy will then allow determination of the parity of the binary variables associated with the vertices of the edge e. Moreover, it can be desired to have a $1-\delta$ success-rate that all Pauli operators $O_e$ provide the correct parities. A union bound solves this problem. It follows that the condition on the number of measurements S, for a $1-\delta$ success-rate of correctly estimating $cut(m)$ is given by the following Equation 29:

$$S>2\cdot 3^4\cdot\log\left(\frac{2|E|}{\delta}\right).\tag{29}$$

The condition in the Equation 29 establishes a lower bound on the number of measurements required.

Alternative Relaxations

Next, consider various alternative relaxations. In other words, this section explains how the herein described teachings can be seen as providing a family of deformations of algorithms. It can be attractive to provide an intermediary stage of the deformation. To this end, the following introduces a second family of quantum random access codes, recalls and unifies some notation, and explains the deformation.

Consider the encoding of two binary variables $m=\{m_i\}_{i\in[2]}$ into a qubit $\mathcal{D}\ (\mathbb{C}^2)$, given by the following Equation 30:

$$f^{(2)}(m)=\frac{1}{2}\left(I+\frac{1}{\sqrt{2}}(m_1X+m_2Z)\right)$$

and denote by $\pi_P^\pm$ the projections onto the $\pm 1$ eigenspaces of the Pauli operators $P\in\{X,Y,Z\}$. Measuring in the X, Z bases allows one to, respectively, recover the variables $m_1$, $m_2$. For example, $$Tr(\pi_X^+\cdot f^{(2)}(+1,m_2)=\frac{1}{2}+\frac{1}{2\sqrt{2}}.$$

This provides the $(2,1,p^{(2)})$-QRAC encoding where $$p^{(2)}=\frac{1}{2}+\frac{1}{2\sqrt{2}}.$$

For quantum rounding, set $$\xi_1^\pm=\frac{1}{2}\left(I\pm\frac{1}{\sqrt{2}}(X+Z)\right)$$

and set $\xi_2^\pm=X\xi_1^\pm X$. Then $\xi_1^\pm$ are the eigenstates associated with the operator $$\frac{1}{\sqrt{2}}(X+Z)$$

while $\xi_2^\pm$ are associated with $$\frac{1}{\sqrt{2}}(X-Z).$$

For notational consistency, one can write $f^{(3)}$ for the map in the Equation 6. Let one also write, for the encoding of a single variable $m=\{m_i\}_{i\in[1]}$ into a qubit $\mathcal{D}(\mathbb{C}^2)$, the map $f^{(1)}(m)=\frac{1}{2}(I+m_1 Z)$. Note that $\mathrm{Tr}(\pi_Z^+ \cdot f^{(1)}(+1))=1$ whence $f^{(1)}$ can be seen as a (1,1,1)-QRAC.

One can unify the notation for three measurement procedures. Let $\mathcal{M}^{(1)}$ be the quantum channel on a single qubit associated with measuring in the Z-basis. Let $\mathcal{M}^{(2)}$ be the quantum channel on a single qubit associated with uniformly at random selecting a measurement basis $\{\xi_i^+, \xi_i^-\}_{i\in[2]}$ and subsequently measuring the qubit in the chosen basis. Let $\mathcal{M}^{(3)}$ be the quantum channel given above that is associated with randomly measuring in magic bases.

Let $G=(V,E)$ be a graph and let $V=\leftrightarrow_{c\in[C]} V_c$ be a partitioning, or coloring, of the graph into C partitions such that any two vertices which share an edge are not contained in the same partition. Fix an instance of the deformation $d\in\{1,2,3\}$. To each partition, $V_c$, associate $n_c$ qubits where $n_c=\lceil |V_c|/d \rceil$. The vertices in $V_c$ are then each associated with a unique weight-1 Pauli operator supported on the $n_c$ qubits. For the deformation $d\in\{1,2,3\}$, this Pauli operator is one of the $d\cdot n_c$ possible operators which are respectively tensor products of the single-qubit Pauli operators $\{I,Z\}$, $\{I,X,Z\}$, $\{I,X,Y,Z\}$. One can write $P_{c,i}$ for the Pauli operator associated with a vertex $v_{c,i}$, where $i\in[|V_c|]$. To each edge e with associated vertices $v_{c,i}, v_{c',i'}$, one can declare the weight-2 Pauli operator $O_e = P_{c,i} P_{c',i'}$, and can define the Hamiltonian according to the following Equation 31:

$$H^{(d)} = \sum_{e\in E} \frac{1}{2}(I - d\cdot O_e)$$

The corresponding embeddings $F^{(d)}$ can be obtained, which can yield a commutative diagram providing $\mathrm{Tr}(H^{(d)} \cdot F^{(d)}(m)) = \mathrm{cut}(m)$ for all $m\in\{-1,1\}^{|V|}$.

Continue by considering a fixed deformation $d\in\{1,2,3\}$ and consider the quantum rounding procedure. Let $\rho_{relax}^{(d)}$ denote a maximum-energy eigenstate of the Hamiltonian $H^{(d)}$. The quantum rounding procedure, when supplied with $\rho_{relax}^{(d)}$ applies $\mathcal{M}^{(d)}$ on all qubits. Let $\gamma^{(d)}$ denote the approximation ratio. Consider the three cases separately below for clarity:

First Case: The deformation d=1 has a Hamiltonian which is diagonal in the computational basis whence $\rho_{relax}^{(1)}$ is also diagonal in the computational basis. In fact, this setup is analogous to QAOA and $\rho_{relax}^{(1)}$ is a linear combination of states $F^{(1)}(m^*)$ for all $m^*$ solving the max-cut problem. The procedure $\mathcal{M}^{(1)}$ does not cause a degradation in the energy of the rounded state. Rather, it simply collapses $\rho_{relax}^{(1)}$ into one instance $F^{(1)}(m^*)$. One can therefore find that $\gamma^{(1)}=1$.

Second Case: Consider the map $\mathcal{M}^{(2)}$ on a single qubit. In expectation, this map can be expressed as the linear operation $\varepsilon^{(2)}$ such that $\varepsilon^{(2)}(I)=I$, $\varepsilon^{(2)}(Y)=0$, and $\varepsilon^{(2)}(P)=\frac{1}{2}P$ for $P\in\{X,Z\}$. Proceeding in the same way as that given above, one can obtain an inequality of the form of the Equation 16, however the prefactor becomes ¼ rather than ⅑. The end result is an approximation ratio which, in expectation, is bounded by ⅝. That is, $\mathbb{E}(\gamma^{(2)})\geq\frac{5}{8}$.

Third Case: The deformation d=3 provides the bound in expectation of the approximation ratio $\mathbb{E}(\gamma^{(3)})\geq\frac{5}{9}$.

Note that the partition of the vertices is superfluous for the deformation d=1. Indeed, since one can associate each vertex with an individual qubit, one can be guaranteed that the two weight-1 Pauli operators $P_{c,i}$, $P_{c',i'}$, used in the construction of the weight-2 Pauli operator $O_e$, are supported on different qubits.

Note that this deformation can be written in an even more granular fashion. Individual partitions of the vertices can be associated with different deformation parameters d. Also different encodings can be used for the same partition. For example, if a color leads to a collection $V_c$ of vertices such that $V_c=3a+b$ with $b\in\{1,2\}$, then one could encode 3a vertices into a qubits, using $f^{(3)}$, and the remaining b vertex/vertices could be encoded into a single qubit using the map $f^{(b)}$.

Note that there is another way to view this deformation. This Supplementary Information section has left the decision on which encoding to use up to the user, however one can also see the decision as being a choice forced by the structure of the graphs under consideration. For example, in the limit of graphs with large degree, such as in the Erdös-Rényi model of graphs with fixed probability of an edge between two vertices, the teachings described herein can require a coloring with many colors. As the number of vertices associated with each color becomes small, say two vertices per color, or eventually one vertex per color, it is reasonable to use the encoding provided by the (2,1,0.85)-QRAC, and eventually the QAOA encoding of one variable into one qubit.

Note that a final way to understand this family of deformations and the associated approximation ratios is to consider the choice of a deformation as a trade-off between the size of the quantum processor and the time spent performing the quantum rounding procedure. Indeed, for the deformation d=1, a larger quantum processor is required, however the rounding procedure is trivial. For the deformation d=3, a smaller quantum processor is permissible, but the cost is a lower approximation ratio. However, if one runs the quantum rounding procedure many times, one then obtains a spread of approximation ratios (whose mean is bounded from below by ⅝). Of course, the problem is max-cut, so after obtaining such a spread, it is clear that one would choose the rounded instance $F^{(3)}(m)$ which obtained the largest cut value, and thus obtain an approximation ratio larger than $\mathbb{E}(\gamma^{(3)})$.

All max-cut problem instances used both in simulation and on hardware by the present inventors were modeled using the docplex interface provided by Qiskit Optimization. These docplex models were then solved classically using IBM ILOG CPLEX, then converted into a non-diagonal Hamiltonian, H as given in the Equation 5 and represented internally as a Qiskit opflow object. Simulations that use the exact relaxed solution $\rho_{relax}$ were solved using Qiskit's NumpyMinimumEigensolver and were then rounded by directly computing $\mathrm{Tr}(H\cdot\rho_{relax})$ or by sampling from $\rho_{relax}$ in random magic bases. Simulations that include solving for an approximate relaxed solution were done using Qiskit's implementation of the Variational Quantum Eigensolver (VQE). For these VQE simulations the COBYLA optimizer was used with maxiter=25,000, rhobeg=1.0, and tol=None.

The same hardware-efficient ansatz used during the hardware experiments of the present inventors was used for all VQE simulations.

All hardware experiments conducted by the present inventors were run on the 27-qubit device ibmq_dublin (Quantum Volume 64). The qubits used for a given experiment were chosen according to the device noise. That is, the present inventors generated a list $Q_{Dublin}$ of the device's qubits such that the first $2 \le k \le 27$ qubits form a contiguous subset of its connectivity graph. Then, the ordering of $Q_{Dublin}$ was determined heuristically to prioritize using the least noisy qubits.

The variational circuit used by the present inventors was a depth-l hardware-efficient variational ansatz with l layers of arbitrary single-qubit rotations interleaved with l−1 entangling blocks of controlled-Z gates. Note that a depth-1 instance of this ansatz yields a product state, while l>1 produces entangled states. Within each repeated block of the ansatz, the controlled-Z gates were applied once between each contiguous pair of qubits.

All hardware experiments conducted by the present inventors solved for an approximate relaxed solution using Qiskit's implementation of the Variational Quantum Eigensolver (VQE). VQE experiments run on hardware were optimized using the Simultaneous Perturbation Stochastic Approximation (SPSA) optimizer with 500 iterations.

The present inventors employed a simple form of Readout Error Mitigation (REM) for all VQE experiments on hardware. Unlike full REM, which requires a number of calibration circuits that scales exponentially in the number of qubits, the present inventors instead performed only single-qubit REM by tensoring together measurement filters computed on each qubit. This requires only a constant number of calibration circuits at the cost of not accounting for correlations between qubits. A modified version of Qiskit's TensoredMeasFitter was used to implement this REM scheme.

This marks the end of the Supplementary Information involving various mathematical proofs and/or lemmas.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 15:
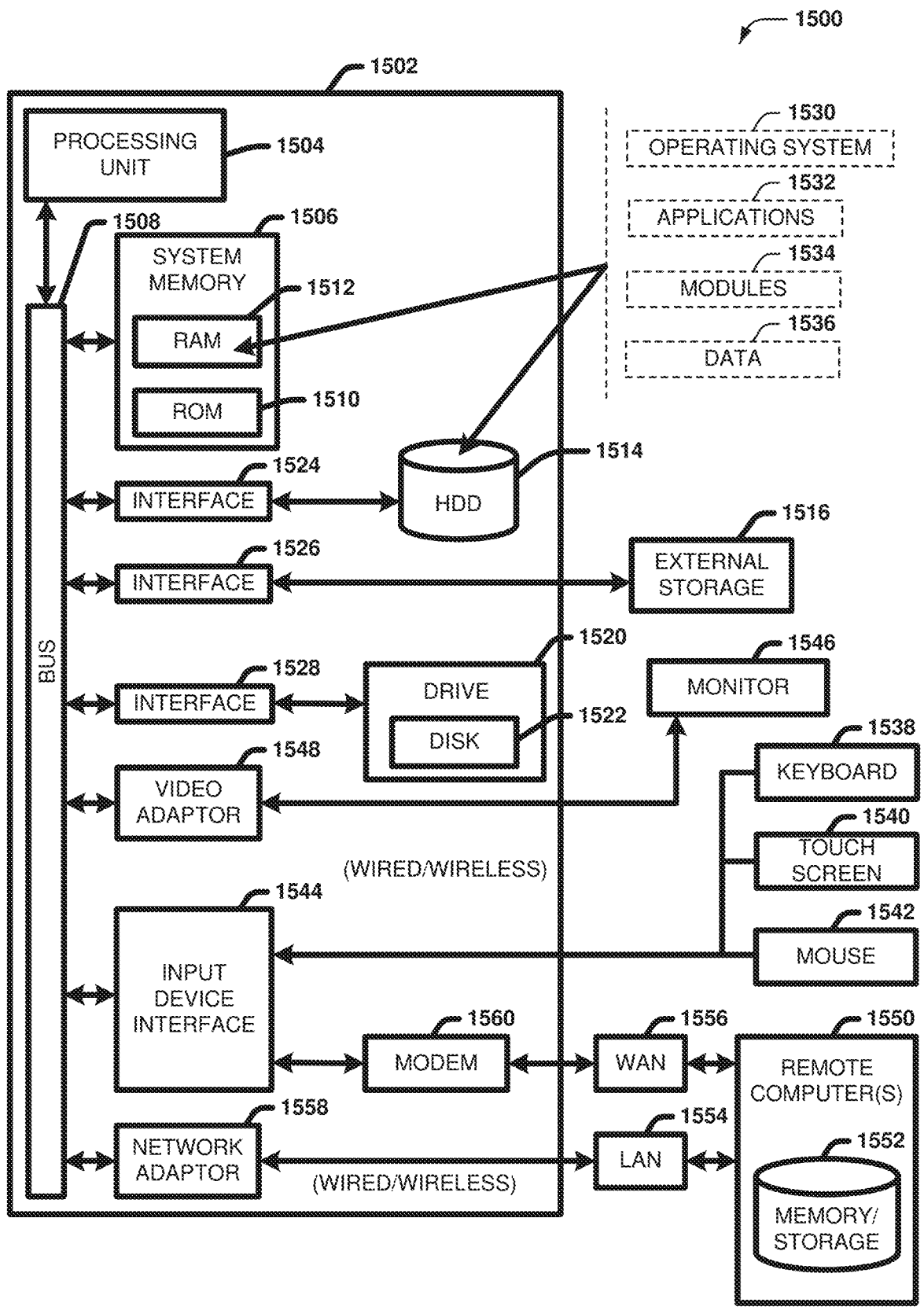
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RANI 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
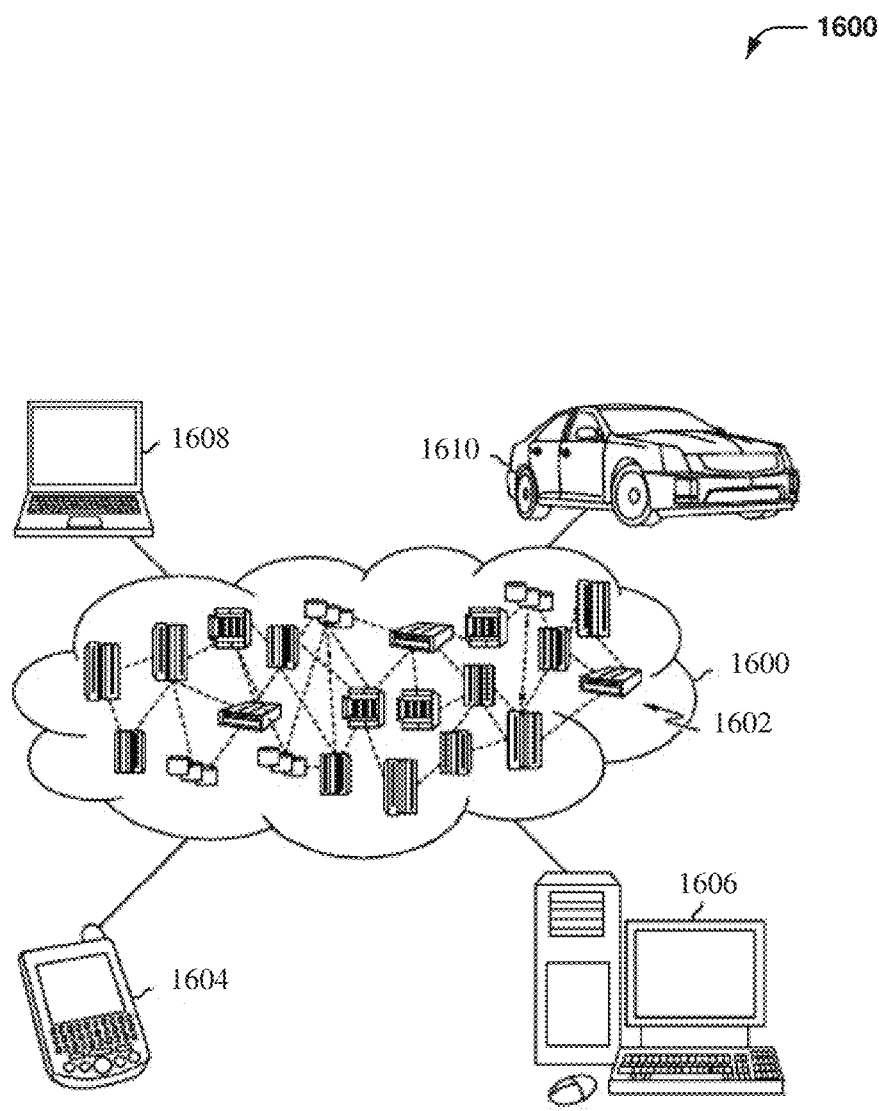
FIG. 16 illustrates an example, non-limiting cloud computing environment in accordance with one or more embodiments described herein.

Referring now to FIG. 16, illustrative cloud computing environment 1600 is depicted. As shown, cloud computing environment 1600 includes one or more cloud computing nodes 1602 with which local computing devices used by cloud consumers, such as, for example, personal digital assistant (PDA) or cellular telephone 1604, desktop computer 1606, laptop computer 1608, and/or automobile computer system 1610 may communicate. Nodes 1602 may communicate with one another. They may be grouped (not shown) physically or virtually, in one or more networks, such as Private, Community, Public, or Hybrid clouds as described hereinabove, or a combination thereof. This allows cloud computing environment 1600 to offer infrastructure, platforms and/or software as services for which a cloud consumer does not need to maintain resources on a local computing device. It is understood that the types of computing devices 1604-1610 shown in FIG. 16 are intended to be illustrative only and that computing nodes 1602 and cloud computing environment 1600 can communicate with any type of computerized device over any type of network and/or network addressable connection (e.g., using a web browser).

Figure 17:
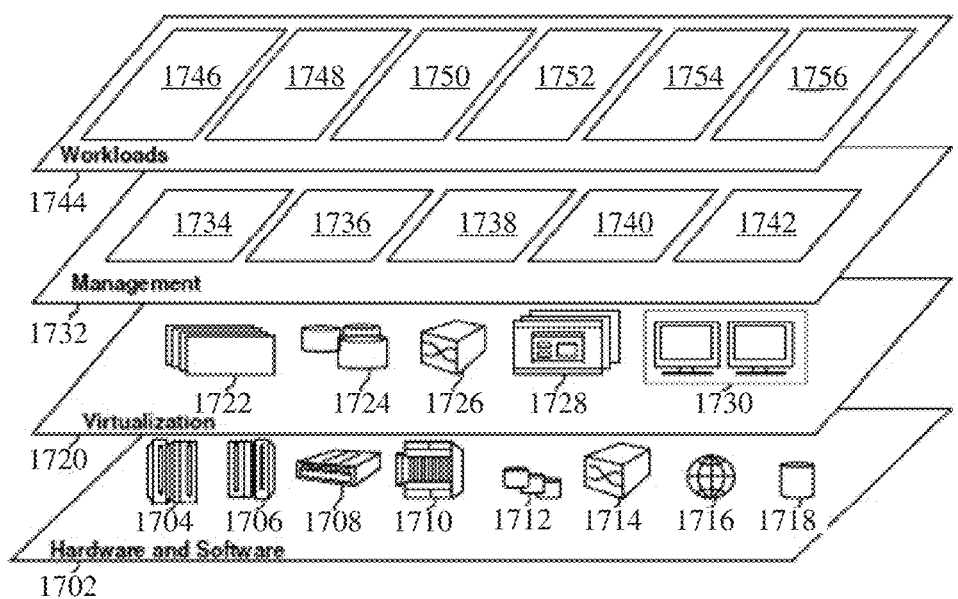
FIG. 17 illustrates example, non-limiting abstraction model layers in accordance with one or more embodiments described herein.

Referring now to FIG. 17, a set of functional abstraction layers provided by cloud computing environment 1600 (FIG. 16) is shown. Repetitive description of like elements employed in other embodiments described herein is omitted for sake of brevity. It should be understood in advance that the components, layers, and functions shown in FIG. 17 are intended to be illustrative only and embodiments of the invention are not limited thereto. As depicted, the following layers and corresponding functions are provided.

Hardware and software layer 1702 includes hardware and software components. Examples of hardware components include: mainframes 1704; RISC (Reduced Instruction Set Computer) architecture based servers 1706; servers 1708; blade servers 1710; storage devices 1712; and networks and networking components 1714. In some embodiments, software components include network application server software 1716 and database software 1718.

Virtualization layer 1720 provides an abstraction layer from which the following examples of virtual entities may be provided: virtual servers 1722; virtual storage 1724; virtual networks 1726, including virtual private networks; virtual applications and operating systems 1728; and virtual clients 1730.

In one example, management layer 1732 may provide the functions described below. Resource provisioning 1734 provides dynamic procurement of computing resources and other resources that are utilized to perform tasks within the cloud computing environment. Metering and Pricing 1736 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1738 provides access to the cloud computing environment for consumers and system administrators. Service level management 1740 provides cloud computing resource allocation and management such that required service levels are met. Service Level Agreement (SLA) planning and fulfillment 1742 provide pre-arrangement for, and procurement of, cloud computing resources for which a future requirement is anticipated in accordance with an SLA.

Workloads layer 1744 provides examples of functionality for which the cloud computing environment may be utilized. Examples of workloads and functions which may be provided from this layer include: mapping and navigation 1746; software development and lifecycle management 1748; virtual classroom education delivery 1750; data analytics processing 1752; transaction processing 1754; and differentially private federated learning processing 1756. Various embodiments of the present invention can utilize the cloud computing environment described with reference to FIGS. 16 and 17 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, and/or data structures, that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory configured to store computer-executable instructions; and
a processor configured to execute at least one of the computer-executable instructions that:
determines a max-cut approximate solution of a graph having a set of vertices and a set of edges, wherein the determining the max-cut approximate solution comprises:
determining a coloring of the graph such that any two vertices that are connected by an edge have different colors, and a quantity of the different colors is minimized;
assigning, based on the coloring, weight-1 Pauli operators to the set of vertices, wherein the assigning comprises, for each color:
based on a respective cardinality of the color of the different colors, determining a respective minimum number of qubits for representing the vertices assigned the color,
based on the respective minimum number of qubits, determining a respective set of weight-1 Pauli operators for the color; and
assigning to each vertex having the color, a unique weight-1 Pauli operator from the respective set of weight-1 Pauli operators for the color;
constructing, using the assigned weight-1 Pauli operators, a non-diagonal quantum Hamiltonian relaxation comprising weight-2 Pauli operator terms representing edge interactions between differently colored vertices;
executing, using a quantum computing device employing the respective minimum number of qubits, the non-diagonal quantum Hamiltonian relaxation to obtain a relaxed quantum state of the non-diagonal quantum Hamiltonian relaxation; and
applying a quantum rounding procedure to convert the relaxed quantum state into a binary string representing the max-cut approximate solution.

2. The system of claim 1, wherein each weight-1 Pauli operator is tensor-padded to a uniform qubit length.

3. The system of claim 1, wherein the quantum computing device comprises a quantum computer.

4. The system of claim 1, wherein the quantum computing device comprises a quantum simulator.

5. The system of claim 1, wherein the quantum computing device comprises a Variational Quantum Eigensolver.

6. The system of claim 1, wherein the quantum rounding procedure comprises magic state rounding.

7. The system of claim 1, wherein the quantum rounding procedure comprises.

8. A computer-implemented method, comprising:
determining, by a system operatively coupled to a processor, a max-cut approximate solution of a graph having a set of vertices and a set of edges, wherein the determining the max-cut approximate solution comprises:
determining a coloring of the graph such that any two vertices that are connected by an edge have different colors, and a quantity of the different colors is minimized;
assigning, based on the coloring, weight-1 Pauli operators to the set of vertices, wherein the assigning comprises, for each color:
based on a respective cardinality of the color of the different colors, determining a respective minimum number of qubits for representing the vertices assigned the color,
based on the respective minimum number of qubits, determining a respective set of weight-1 Pauli operators for the color;
assigning to each vertex having the color, a unique weight-1 Pauli operator from the respective set of weight-1 Pauli operators for the color;
constructing, using the assigned weight-1 Pauli operators, a non-diagonal quantum Hamiltonian relaxation comprising weight-2 Pauli operator terms representing edge interactions between differently colored vertices;
executing, using a quantum computing device employing the respective minimum number of qubits, the non-diagonal quantum Hamiltonian relaxation to obtain a relaxed quantum state of the non-diagonal quantum Hamiltonian relaxation; and
applying a quantum rounding procedure to convert the relaxed quantum state into a binary string representing the max-cut approximate solution.

9. The computer-implemented method of claim 8, wherein each weight-1 Pauli operator is tensor-padded to a uniform qubit length.

10. The computer-implemented method of claim 8, wherein the quantum computing device comprises a quantum computer.

11. The computer-implemented method of claim 8, wherein the quantum computing device comprises a quantum simulator.

12. The computer-implemented method of claim 8, wherein the quantum computing device comprises a Variational Quantum Eigensolver.

13. The computer-implemented method of claim 8, wherein the quantum rounding procedure comprises magic state rounding.

14. The computer-implemented method of claim 8, wherein the quantum rounding procedure comprises Pauli rounding.

15. A computer program product for facilitating max-cut approximate solutions via quantum relaxation, the computer program product comprising a computer-readable memory having program instructions embodied therewith, the program instructions executable by a processor to cause the processor to:
determine a max-cut approximate solution of a graph having a set of vertices and a set of edges, wherein the determining the max-cut approximate solution comprises:
determining a coloring of the graph such that any two vertices that are connected by an edge have different colors, and a quantity of the different colors is minimized;

assigning, based on the coloring, weight-1 Pauli operators to the set of vertices, wherein the assigning comprises, for each color:
  based on a respective cardinality of the color of the different colors, determining a respective minimum number of qubits for representing the vertices assigned the color,
  based on the respective minimum number of qubits, determining a respective set of weight-1 Pauli operators for the color;
  assigning to each vertex having the color, a unique weight-1 Pauli operator from the respective set of weight-1 Pauli operators for the color;
constructing, using the assigned weight-1 Pauli operators, a non-diagonal quantum Hamiltonian relaxation comprising weight-2 Pauli operator terms representing edge interactions between differently colored vertices;
executing, using a quantum computing device employing the respective minimum number of qubits, the non-diagonal quantum Hamiltonian relaxation to obtain a relaxed quantum state of the non-diagonal quantum Hamiltonian relaxation; and
applying a quantum rounding procedure to convert the relaxed quantum state into a binary string representing the max-cut approximate solution.

16. The computer program product of claim 15, wherein each weight-1 Pauli operator is tensor-padded to a uniform qubit length.

17. The computer program product of claim 15, wherein the quantum computing device comprises a quantum computer.

18. The computer program product of claim 15, wherein the quantum computing device comprises a quantum simulator.

19. The computer program product of claim 15, wherein the quantum computing device comprises a Variational Quantum Eigensolver.

20. The computer program product of claim 15, wherein the quantum rounding procedure comprises magic state rounding or Pauli rounding.

* * * * *